US012713438B2

(12) United States Patent
Shi et al.

(10) Patent No.: US 12,713,438 B2
(45) Date of Patent: Aug. 18, 2026

(54) METHOD FOR TRANSMITTING PHYSICAL DOWNLINK CONTROL CHANNEL AND DEVICE

(71) Applicant: GUANGDONG OPPO MOBILE TELECOMMUNICATIONS CORP., LTD., Dongguan (CN)

(72) Inventors: Zhihua Shi, Dongguan (CN); Yun Fang, Dongguan (CN); Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 289 days.

(21) Appl. No.: 18/472,172

(22) Filed: Sep. 21, 2023

(65) Prior Publication Data

US 2024/0023127 A1 Jan. 18, 2024

Related U.S. Application Data

(63) Continuation of application No. PCT/CN2021/082815, filed on Mar. 24, 2021.

(51) Int. Cl.
*H04W 72/231* (2023.01)
*H04L 5/00* (2006.01)

(52) U.S. Cl.
CPC ......... *H04W 72/231* (2023.01); *H04L 5/0035* (2013.01); *H04L 5/0051* (2013.01); *H04L 5/0053* (2013.01)

(58) Field of Classification Search
CPC ... H04W 72/231; H04L 5/0035; H04L 5/0053
See application file for complete search history.

(56) References Cited

U.S. PATENT DOCUMENTS

2020/0280409 A1* 9/2020 Grant .................... H04L 5/0044
2020/0337058 A1 10/2020 Song et al.
(Continued)

FOREIGN PATENT DOCUMENTS

CN 110351850 10/2019
CN 110603773 12/2019
(Continued)

OTHER PUBLICATIONS

Qualcomm Incorporated, "Enhancements on Multi-TRP for PDCCH, PUCCH and PUSCH," 3GPP TSG-RAN WG1 Meeting #103-e, R1-2009251, Oct. 2020.
(Continued)

*Primary Examiner* — Elton Williams
(74) *Attorney, Agent, or Firm* — Hodgson Russ LLP

(57) ABSTRACT

An embodiment of the present application provides a method for transmitting a PDCCH and a device. The method includes: receiving, by a terminal device, PDCCH from a network device on a first CORESET. DMRS for the PDCCH corresponds to N active TCI-states, where N=2. Before the terminal device receives the PDCCH, the method further includes: receiving second configuration information; and configuring M TCI-states for the first CORESET according to the second configuration information, where M≥N and M is an integer. After the terminal device receives the second configuration information, the method further includes: receiving, by the terminal device, first MAC CE signaling used to indicate the N active TCI-states among the M TCI-states.

15 Claims, 9 Drawing Sheets

(56) References Cited

U.S. PATENT DOCUMENTS

| | | | | |
|---|---|---|---|---|
| 2020/0351841 | A1 | 11/2020 | Cirik et al. | |
| 2021/0014931 | A1* | 1/2021 | Noh | H04L 5/0035 |
| 2022/0116256 | A1* | 4/2022 | Shahmohammadian | H04L 5/0048 |
| 2022/0225319 | A1* | 7/2022 | Khoshnevisan | H04W 72/0453 |

FOREIGN PATENT DOCUMENTS

| | | |
|---|---|---|
| CN | 112272931 | 1/2021 |
| CN | 112514314 | 3/2021 |
| WO | 2021008433 | 1/2021 |

OTHER PUBLICATIONS

Samsung, "Enhancements on Multi-TRP for PDCCH, PUCCH and PUSCH," 3GPP TSG RAN WG1 #103-e, R1-2008149, Oct. 2020.

Oppo, "Enhancements on multi-TRP for PDCCH, PUCCH and PUSCH," 3GPP TSG RAN WG1 #103-e, R1-2008218, Oct. 2020.

Wipo, International Search Report and Written Opinion for PCT/CN2021/082815, Dec. 16, 2021.

Nokia et al., "Corrections to CORESET and PDCCH TCI state release," 3GPP TSG-RAN WG2 Meeting #110-e, R2-2004904, Jun. 2020.

"3rd Generation Partnership Project; Technical Specification Group Radio Access Network; NR; Radio Resource Control (RRC) protocol specification (Release 17)," 3GPP TS 38.331, Mar. 2023, v17.4.0.

CNIPA, First Office Action for CN Application No. 202311398345.2, Nov. 11, 2024.

CNIPA, Notice of Priority Examination for CN Application No. 202311398345.2, Oct. 23, 2024.

EPO, Communication for EP Application No. 21932149.4, Jul. 16, 2025.

EPO, Extended European Search Report for EP Application No. 21932149.4, Apr. 25, 2024.

Lenovo et al., "Enhancements for HST-SFN deployment," 3GPP TSG RAN WG1 #104-e, R1-2100988, Jan. 2021.

CNIPA, Second Office Action for CN Application No. 202311398345.2, Feb. 11, 2025.

EPO, Communication for EP Application No. 21932149.4, Feb. 21, 2025.

EPO, Communication for EP Application No. 21932149.4, Apr. 30, 2026.

* cited by examiner 8 bits 1 bit

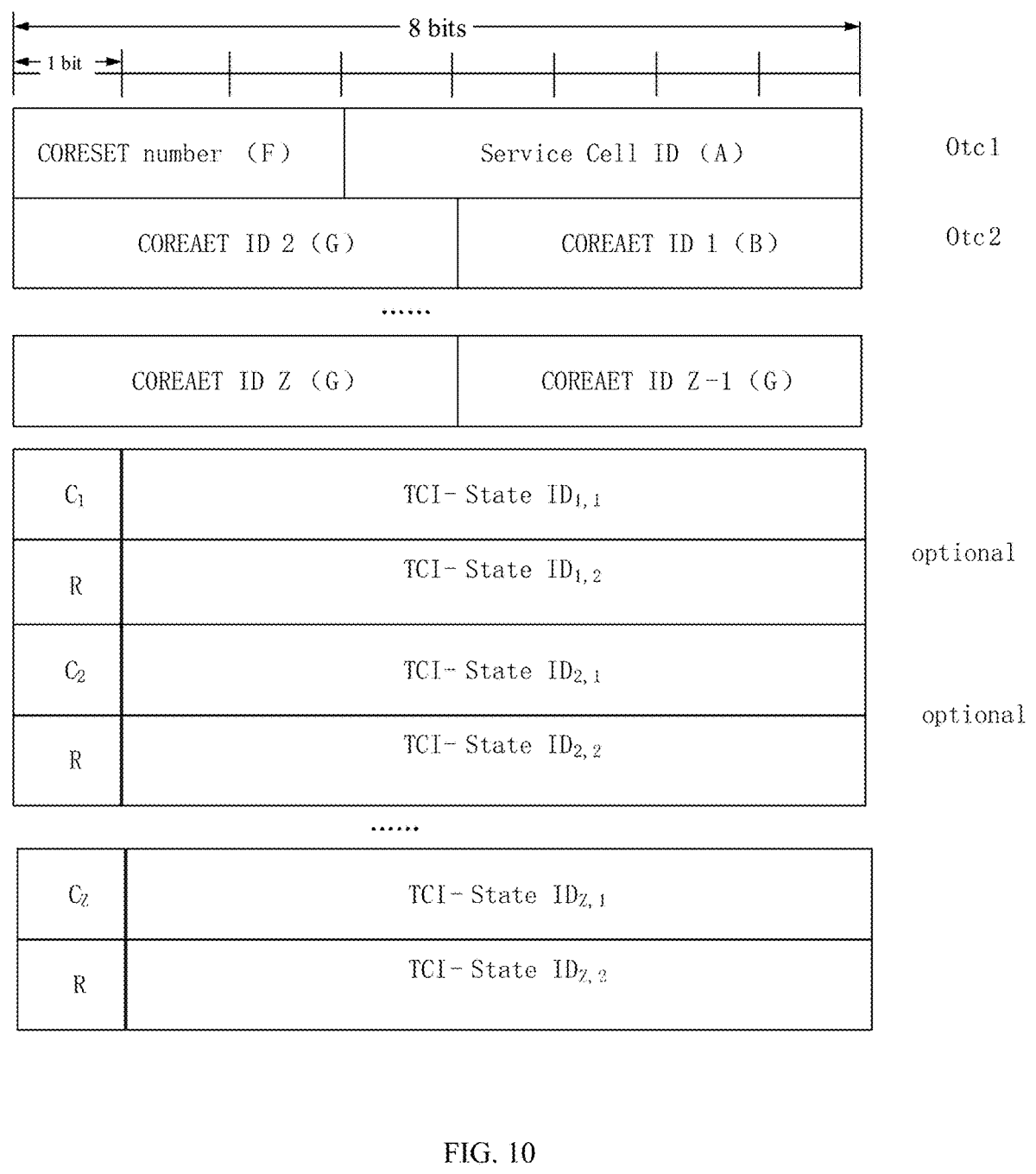

| | | |
|---|---|---|
| CORESET number (F) | Service Cell ID (A) | Otc1 |
| COREAET ID 2 (G) | COREAET ID 1 (B) | Otc2 |

......

| | |
|---|---|
| COREAET ID Z (G) | COREAET ID Z-1 (G) |

| | | |
|---|---|---|
| $C_1$ | TCI-State $ID_{1,1}$ | optional |
| R | TCI-State $ID_{1,2}$ | |
| $C_2$ | TCI-State $ID_{2,1}$ | optional |
| R | TCI-State $ID_{2,2}$ | |

......

| | |
|---|---|
| $C_Z$ | TCI-State $ID_{Z,1}$ |
| R | TCI-State $ID_{Z,2}$ |

FIG. 10

METHOD FOR TRANSMITTING PHYSICAL DOWNLINK CONTROL CHANNEL AND DEVICE

CROSS-REFERENCE TO RELATED APPLICATION(S)

This application is a continuation of International Application No. PCT/CN2021/082815, filed Mar. 24, 2021, the entire disclosure of which is incorporated herein by reference.

TECHNICAL FIELD

Embodiments of the present disclosure relate to the communication technical field, and more specifically, to a method and device for transmitting a physical downlink control channel.

BACKGROUND

The 5th generation (5G) mobile communication is also called New Radio (NR) mobile communication. Compared with the Long Term Evolution (LTE) system, the NR system supports a larger transmission bandwidth, more transceiver antenna arrays, a higher transmission rate, and a more flexible scheduling mechanism with a smaller granularity.

A common transmission method in a 5G mobile communication system is multi-Transmission and Reception Point (TRP) transmission. The multi-TRP transmission means that on the same carrier, multiple TRPs communicate with the same terminal device at the same time. The multi-TRP transmission is usually used for Physical Downlink Shared Channel (PDSCH) transmission. Based on the multi-TRP transmission, multiple TRPs send Downlink Control Information (DCI) to the same terminal device, so as to realize the PDSCH multi-TRP enhancement scheme.

In order to improve the performance of receiving a Physical Downlink Control Channel (PDCCH) by a terminal device, it is now considered to use a multi-TRP transmission mode to transmit the PDCCH. Therefore, how to implement PDCCH enhancement by using the multi-TRP transmission mode is an urgent problem to be solved.

SUMMARY

Embodiments of the present disclosure provide a method and device for transmitting a physical downlink control channel, and the purpose of improving the performance for a terminal device to receive a PDCCH is achieved by using a multi-TRP transmission mode to transmit the PDCCH.

In a first aspect, an embodiment of the present disclosure provides a method for transmitting a physical downlink control channel, including:

receiving, by a first device, Physical Downlink Control Channel (PDCCH) on a first Control Resource Set (CORESET), wherein a Demodulation Reference Signal (DMRS) for the PDCCH corresponds to N active Transmission Configuration Indicator-States (TCI-states), where N≥2 and N is an integer.

In a second aspect, an embodiment of the present disclosure provides a method for transmitting a physical downlink control channel, including:

sending, by a second device, Physical Downlink Control Channel (PDCCH) to a first device on a first Control Resource Set (CORESET), wherein a Demodulation Reference Signal (DMRS) for the PDCCH corresponds to N active Transmission Configuration Indicator-States (TCI-states), where N≥2 and N is an integer.

In a third aspect, an embodiment of the present disclosure provides a first device, including: a memory storing an executable program code; and a processor and a transceiver coupled to the memory; wherein the processor and the transceiver are used for perform the method according to the embodiments in the first aspect.

In a fourth aspect, an embodiment of the present disclosure provides a second device, including: a memory storing an executable program code; a transceiver and a processor coupled to the memory; wherein the processor and the transceiver are used to perform the method according to the embodiments in the second aspect.

In a fifth aspect, an embodiment of the present disclosure provides a computer-readable storage medium, including instructions which, when run on an electronic device, cause the electronic device to perform the method described in the above first aspect or the second aspect.

In a sixth aspect, an embodiment of the present disclosure provides a computer program product including instructions which, when run on an electronic device, cause the electronic device to perform the method described in the first aspect or the second aspect of the present disclosure.

In a seventh aspect, an embodiment of the present disclosure provides a chip, the chip is coupled with a memory in an electronic device, so that the chip calls program instructions stored in the memory when the chip runs, so as to perform the method described in the above first aspect or the second aspect.

In the methods and devices for transmitting the physical downlink control channel provided by the embodiments of the present disclosure, the second device sends the PDCCH on the first CORESET; correspondingly, the first device receives the PDCCH on the first CORESET, and the DMRS for the PDCCH corresponds to N active TCI-states. In this solution, the PDCCH enhancement is implemented by using the multi-TRP transmission mode to transmit the PDCCH, thereby improving the performance for the first device to receive the PDCCH.

BRIEF DESCRIPTION OF THE DRAWINGS

FIG. 10 is another schematic diagram of first MAC CE signaling in a method for transmitting a physical downlink control channel provided by an embodiment of the present disclosure;

DETAILED DESCRIPTION

Figure 1:
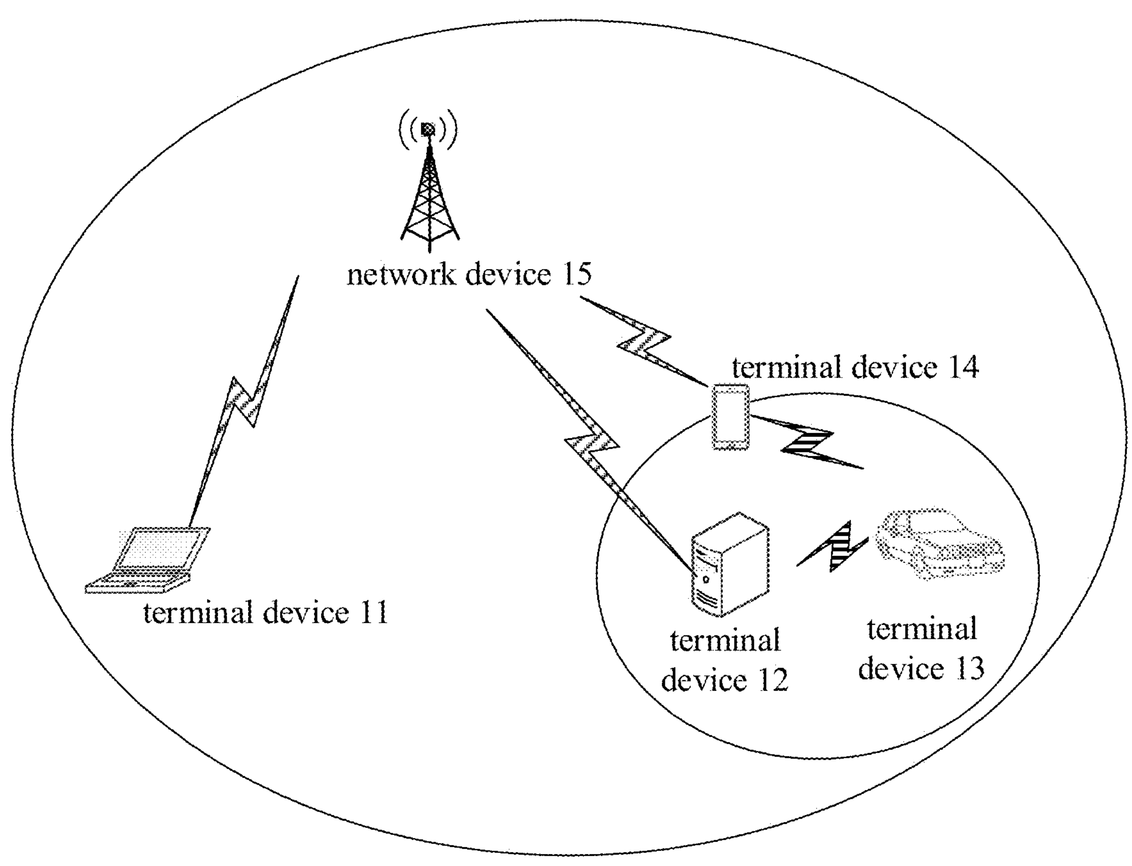
FIG. 1 is a schematic diagram of a network architecture of a method for transmitting a physical downlink control channel provided in an embodiment of the present disclosure.

The following will describe the technical solutions in the embodiments of the present disclosure with reference to the drawings in the embodiments of the present disclosure. Apparently, the described embodiments are only some of the embodiments of the present disclosure, not all of embodiments of the present disclosure. Based on the embodiments in the present disclosure, all other embodiments obtained by those skilled in the art without making creative efforts belong to the scope of protection of the present disclosure.

In the embodiments of the present disclosure, words such as "exemplary" or "for example" are used as examples, exemplifications or illustrations. Any embodiment or design scheme described as "exemplary" or "for example" in the embodiments of the present disclosure should not be interpreted as being more preferred or more advantageous than other embodiments or design schemes. Rather, the use of words such as "exemplary" or "for example" is intended to present related concepts in a concrete manner.

The term "and/or" herein is just an association relationship describing associated objects, which means that there can be three kinds of relationships. For example, A and/or B can mean three cases: A alone, B alone, and A and B together. The symbol "I" herein indicates that the associated objects are in an "or" relationship, for example, A/B indicates A or B.

At present, the design goal of the 5G mobile communication system includes high-frequency band and large-bandwidth communication, and the high-frequency band is, for example, a frequency band above 60 GHz. When the operating frequency becomes higher, the path loss parameter of the transmission path increases, thereby affecting the coverage capability of the high-frequency system. In order to effectively ensure the coverage of high-frequency NR systems, an effective solution is a massive antenna array-based multiple-input multiple-output (Massive Maximum Input Minimum Output, Massive MIMO) scheme, which uses multiple beam technology to improve the coverage capability. The beam is also called hybrid beam, or loosely called analog beam.

Generally speaking, in traditional 2G, 3G, and 4G communication systems, a cell uses a relatively wide beam to cover an entire cell. A cell is also called a sector. Therefore, all terminal devices within the coverage of the cell have the opportunity to obtain transmission resources allocated by the system. The terminal device is also referred to as user equipment (UE) and the like.

In the 5G communication system, the entire cell is covered by multi-beam, that is, each cell covers a relatively small range, and the effect of multiple beams covering the entire cell is achieved by sweeping in time. A terminal device identifies a beam by a signal carried on the beam.

For example, different Synchronization Signal/PBCH Blocks (SSBs) are transmitted on different beams. A terminal device distinguishes different beams through different SSBs. A SSB may also be expressed as a SS Block, SS/PBCH block.

For another example, different Channel state information reference signals (CSI-RSs) are transmitted on different beams. A terminal device identifies different beams through different CSI-RSs or CSI-RS resources.

Based on the above, it can be seen that when the system is actually implemented, a beam actually corresponds to a visible signal, and thus the discussion of the signal implies the discussion of the beam.

In a multi-beam system, both a PDCCH and a PDSCH may be transmitted through different downlink transmission beams. For systems below 6G, since terminal devices do not have analog beams, terminal devices use omnidirectional antennas (or near-omnidirectional antennas) to receive signals sent by different downlink beams on the network side. For a millimeter wave system, there may be an analog beam on the terminal device side, and thus a terminal device may use a downlink receiving beam to receive a corresponding signal. At this time, corresponding beam indication information is needed to assist the terminal device to determine information about the transmitting beam on the network side, or the terminal device uses the corresponding beam indication information to determine information about the receiving beam.

In the NR protocol(s), the beam indication information does not directly indicate the beam itself, but performs indication through Quasi co-location (QCL) assumption between signals. For a terminal device, receiving a corresponding signal/channel by the terminal device is also performed based on the QCL assumption. The QCL assumption is indicated by a Transmission Configuration Indicator state (TCI-state). The network side configures and/or indicates the TCI-state through relevant signaling. The relevant signaling is, for example, Radio Resource Control (RRC) signaling, Medium Access Control Control Element (MAC CE), or Downlink control information (DCI), etc.

In the 16th version of NR (version 16, R16), it is proposed to use multi-TRP transmission to realize the enhancement of PDSCH. Multi-TRP transmission means that on the same carrier, multiple TRPs communicate with a terminal device at the same time. Since in the NR system, multiple TRP transmissions, or multiple panels or multiple beams can perform transmission with one terminal at the same time, the same solution can be used, and thus in the description, they are often not distinguished (for example, they are collectively referred to as multi-TRP transmission, or written as multiple TRP/panel/beam transmissions). The enhancement of PDSCH by using multi-TRP transmission includes the following two kinds of schemes:

First Kind: Single-PDCCH Based Scheme.

In this scheme, a terminal device only detects one PDCCH. A DCI is obtained based on the detection, and the DCI is used to indicate related information of data simultaneously transmitted on multiple TRPs. In this scheme, the terminal device cannot see multiple TRP transmissions from the protocol plane, but can only see that one transmission needs to correspond to multiple TCI-states. That is to say, the first scheme implicitly indicates multi-TRP transmission through multiple TCI-states.

Second Kind: Multiple-PDCCH Based Scheme.

In this scheme, the terminal device receives different PDCCHs from multiple TRPs. Afterwards, the terminal device detects these PDCCHs, and obtains a DCI carried by each PDCCH. Each DCI is used to indicate related indication information of a data transmission. The terminal device cannot see multiple TRP transmissions from the protocol plane, but can only see that a Control Resource Set (CORESET) corresponding to a DCI scheduling data may be associated with different CORESET resource pool numbers, that is, different DCIs correspond to different control resource set pool indexes (coresetPoolIndex). That is to say, the second scheme implicitly indicates multi-TRP transmission through multiple different coresetPoolIndexes.

In the first kind of scheme and the second kind of scheme above, since the PDCCH is a PDCCH sent from the network side to the terminal device in the NR system, the PDCCH is also called NR-PDCCH.

Compared with the second kind of scheme, in the above first kind of scheme, the terminal device only needs to detect one PDCCH, and the detection complexity of the control channel is relatively low. But this scheme requires that different TRPs can quickly exchange information.

In the above second kind of scheme, the terminal device needs to detect multiple PDCCHs on the same carrier at the same time, the complexity is relatively high, but the flexibility and robustness are improved.

The possible application scenarios of the second kind of scheme are, for example, the following S1-1 to S1-4:

S1-1. Multiple TRPs belong to the same cell, and the connection (backhaul) between the TRPs is ideal. That is to say, information exchange can be performed quickly between TRPs.

S1-2. Multiple TRPs belong to the same cell, and the connection (backhaul) between the TRPs is not ideal. That is to say, TRPs cannot exchange information quickly, but can only exchange data relatively slowly.

S1-3. Multiple TRPs belong to different cells, and the connection (backhaul) between the TRPs is ideal.

S1-4. Multiple TRPs belong to different cells, and the connection (backhaul) between the TRPs is not ideal.

In addition, since multi-beam transmission, multi-antenna panel transmission and multi-TRP transmission are similar, multi-beam can be used instead of multi-TRP in S1-1 to S1-4 above to obtain four multi-beam application scenarios. Similarly, by replacing the multi-TRP in S1-1 to S1-4 above with multi-antenna panel, four multi-antenna panel application scenarios can be obtained.

The above first kind of scheme is only applicable to ideal backhaul scenarios, namely the above scenarios S1-1 and S1-3.

At present, in the NR system, the transmission scheme of the physical downlink channel is as follows:

The network side indicates the transmission of a PDCCH by configuring a Control Resource Set (CORESET) and a search space. The search space is also referred to as a search space set and the like. The control resource set includes multiple physical resource blocks in the frequency domain and one to three OFDM symbols in the time domain. The time-domain resources occupied by CORESET are semi-statically configured by a higher layer parameter. The search space is a set of PDCCH candidates under one or more aggregation levels. The aggregation level of the PDCCH actually sent by the base station is determined by the base station. Since there is no relevant signaling to inform the UE, the UE needs to blindly detect PDCCH(s) at different aggregation levels. The PDCCH to be blindly detected is called a PDCCH candidate. The UE decodes the PDCCH candidate in the search space, and if the CRC check is passed, the content of the decoded PDCCH is considered valid for the UE, and the information obtained by decoding is used for subsequent operations.

In NR, in each downlink BWP of each serving cell, the network side can configure up to 10 search space sets for a user, and time domain configuration information is configured in the search space sets to indicate time domain positions for the user to detect the PDCCH(s). Also, the network side configures a set-associated CORESET ID for each search space set, and the user can obtain physical resources of the search space set in the frequency domain through the CORESET ID. Each search space set has a uniquely associated CORESET ID. Different search space sets may be associated to the same CORESET ID. The UE determines the time-frequency domain position(s) of the PDCCH candidate(s) according to the time domain given by the search space set(s), the frequency domain of the associated CORESET ID, and other parameters in the search space set(s).

When configuring CORESET, the network configures one or more TCI states for each CORESET, and the one or more TCI states are used to indicate a relevant parameter required by the user for demodulation and detection of a PDCCH candidate in a search space associated with the CORESET. When the network configures multiple TCI states for a CORESET, the network activates a TCI state for the CORESET through MAC CE signaling to assist the terminal device in demodulating the PDCCH.

In addition, the network also configures a higher layer index (that is, CORESET pool index, the corresponding name in RRC is coresetPoolIndex) for each CORESET to indicate whether the CORESET is in the same CORESET pool. The value range includes 0 and 1. During implementation, one CORESET pool may correspond to one TRP. For example, for CORESETs configured with the same higher layer index, the user thinks that this is data from the same TRP. From the protocol, we can only see whether different CORESET pool indexes are associated, but cannot see the physical entity of TRP.

According to the above, it can be seen that the R15 and R16 versions adopt multi-TRP transmission to realize the enhancement of PDSCH. Moreover, the above-mentioned schemes of implementing PDSCH enhancement by using multi-TRP transmission are aimed at the case of same carrier. For example, in the second scheme above, the terminal device detects multiple PDCCHs on the same carrier to obtain multiple DCIs. The number of DCIs is usually 2. Each DCI may schedule a corresponding PDSCH, and multiple PDSCHs are also on the same carrier.

In version 17 (R17), it is proposed to use multi-TRP transmission to realize the enhancement of Physical Downlink Control Channel (PDCCH). However, the industry has not proposed a suitable solution. Therefore, how to implement PDCCH enhancement by using the multi-TRP transmission mode is an urgent problem to be solved.

Based on this, embodiments of the present disclosure provide a method for transmitting a physical downlink control channel, a communication device, and an apparatus. By adopting a multi-TRP transmission mode to transmit a PDCCH, the purpose of improving the performance for a terminal device to receive a PDCCH is achieved.

The methods for transmitting a physical downlink control channel provided by embodiments of the present disclosure may be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system, a future evolved system or a system in which multiple kinds of communication are fused, and so on. Many application scenarios may be included, e.g., Machine to Machine (M2M), Device to Device (D2D), Vehicle to Everything (V2X), sidelink communication, or other communication systems.

Optionally, the communication systems in embodiments of the present disclosure may be applied to a Carrier Aggregation (CA) scenario, may also be applied to a Dual Connectivity (DC) scenario, and may also be applied to a standalone (SA) network deployment scenario.

Embodiments of the present disclosure are described in combination with a first device and a second device. The first device may also be called terminal device, User Equipment (UE), access terminal, user unit, user station, mobile station, mobile terminal, remote station, remote terminal, mobile device, user terminal, terminal, wireless communication device, user agent or user device, etc.

The first device may be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN).

In embodiments of the present disclosure, the first device may be deployed on land, including indoor or outdoor, handheld, wearable or vehicle-mounted; or, the terminal device may be deployed on water (such as on ships, etc.); or, the terminal device may be deployed in the air (such as on aircraft, balloons, and satellites, etc.).

In embodiments of the present disclosure, the first device may be a mobile phone, a tablet computer (Pad), a computer with wireless transceiver function, a virtual reality (VR) terminal device, an augmented reality (AR) terminal device, a wireless terminal device in industrial control, a wireless terminal device in self driving, a wireless terminal devices in remote medical, a wireless terminal device in smart grid, a wireless terminal device in transportation safety, a wireless terminal device in smart city, or a wireless terminal device in smart home, etc.

By way of example and not limitation, in embodiments of the present disclosure, the first device may also be a wearable device. The wearable device may also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

In embodiments of the present disclosure, the second device may be a device for communicating with a mobile device. The second device may be an Access Point (AP) in WLAN, a base station (BTS, Base Transceiver Station) in GSM or CDMA, or a base station (NB, NodeB) in WCDMA, an evolved base station (Evolutional Node B, eNB or eNodeB) in LTE, or a relay station or an access point, or a vehicle-mounted device, a wearable device, a network device (gNB) in an NR network, or a network device in future evolved PLMN network or a network device in a NTN network. In scenarios such as V2X communication or D2D communication, the second device may also be a terminal device.

By way of example and not limitation, in embodiments of the present disclosure, the second device may have mobile characteristics, for example, the network device may be a mobile device. Optionally, the second device may be a satellite, or a balloon station. For example, the satellite may be a Low Earth Orbit (LEO) satellite, a Medium Earth Orbit (MEO) satellite, a Geostationary Earth Orbit (GEO) satellite, or a High Elliptical Orbit (HEO) satellite, etc. Optionally, the second device may also be a base station deployed on land, or water, etc.

In embodiments of the present disclosure, the second device may provide services for a cell, and the first device communicates with the second device through transmission resources (for example, frequency domain resources, or spectrum resources) used by the cell. The cell may be a cell corresponding to the second device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

FIG. 1 is a schematic diagram of a network architecture of a method for transmitting a physical downlink control channel provided by an embodiment of the present disclosure. Referring to FIG. 1, a terminal device 11 and a network device 15 form a multi-TRP transmission system. In this scenario, the network device 15 is, for example, a base station, a transmission and reception point, and so on. A terminal device 14, a terminal device 12 and a terminal device 13 form a multi-TRP transmission system. In this scenario, the terminal device 14 and the terminal device 12 may be regarded as second devices, and the terminal device 13 may be regarded as the first device, and this is applicable to scenarios such as D2D, or V2X.

In the NR system, the same scheme may be used for multi-TRP transmission, multi-antenna panel transmission, and multi-beam transmission. Therefore, although the architecture shown in FIG. 1 only illustrates multi-TRP transmission, it can be understood that the embodiments of the present disclosure are also applicable to multi-antenna panel transmission and multi-beam transmission. The multi-antenna panel transmission may also be referred to as multi-panel transmission.

Figure 2A:
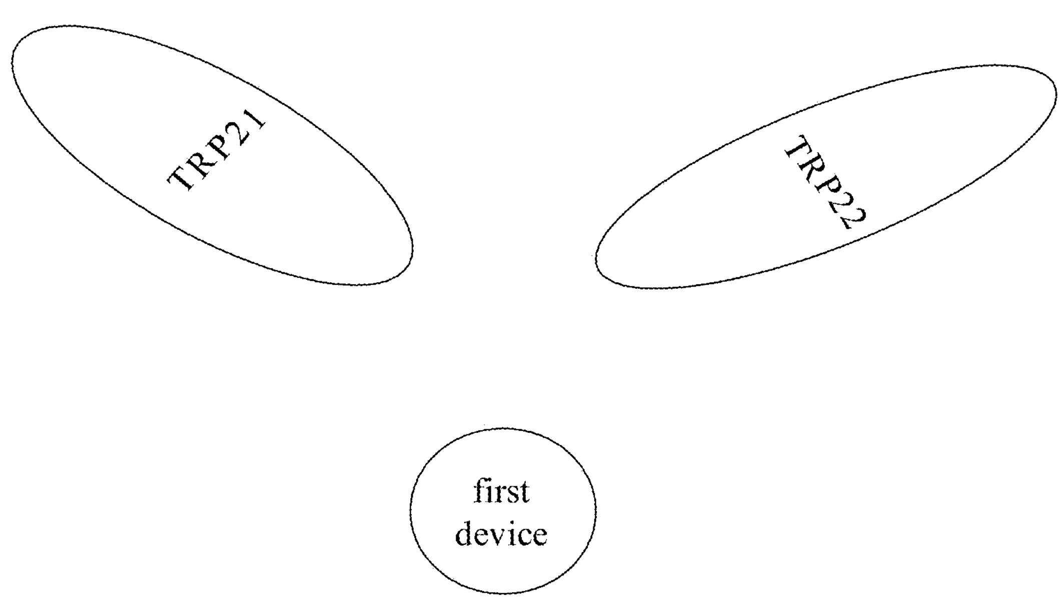
FIG. 2A is a schematic diagram of multi-TRP transmission in a method for transmitting a physical downlink control channel provided in an embodiment of the present disclosure.

FIG. 2A is a schematic diagram of multi-TRP transmission in a method for transmitting a physical downlink control channel provided by an embodiment of the present disclosure. Referring to FIG. 2A, TRP21 and TRP22 simultaneously transmit a PDCCH to a first device.

Figure 2B:
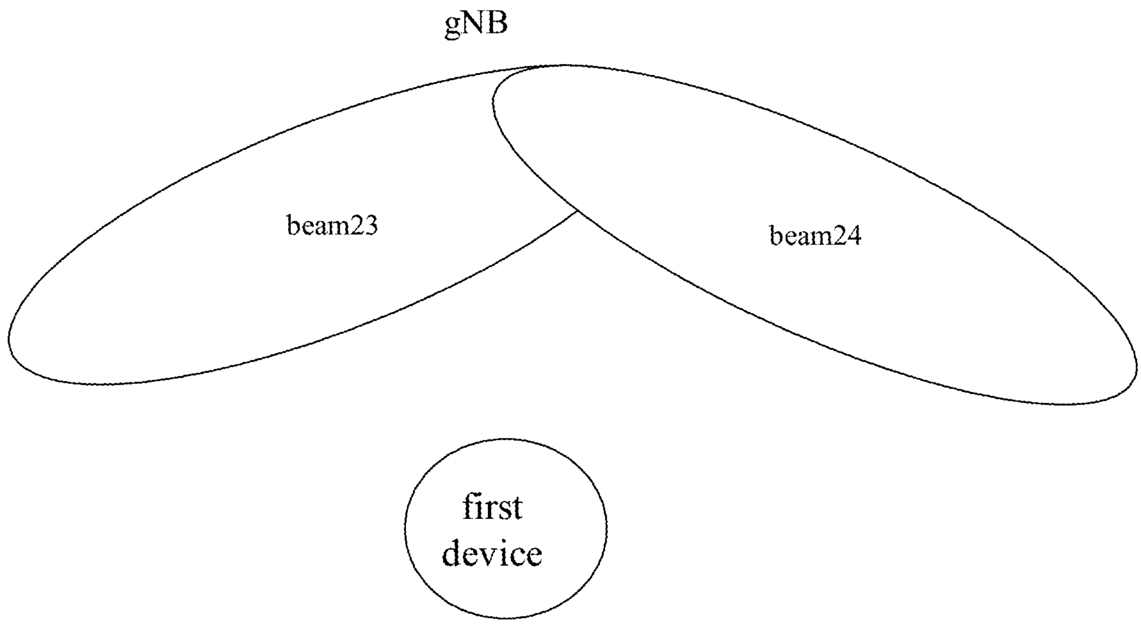
FIG. 2B is a schematic diagram of multi-beam transmission in a method for transmitting a physical downlink control channel provided in an embodiment of the present disclosure.

FIG. 2B is a schematic diagram of multi-beam transmission in a method for transmitting a physical downlink control channel provided in an embodiment of the present disclosure. Referring to FIG. 2B, two beams of a gNB simultaneously transmit a PDCCH to a first device.

Figure 3:
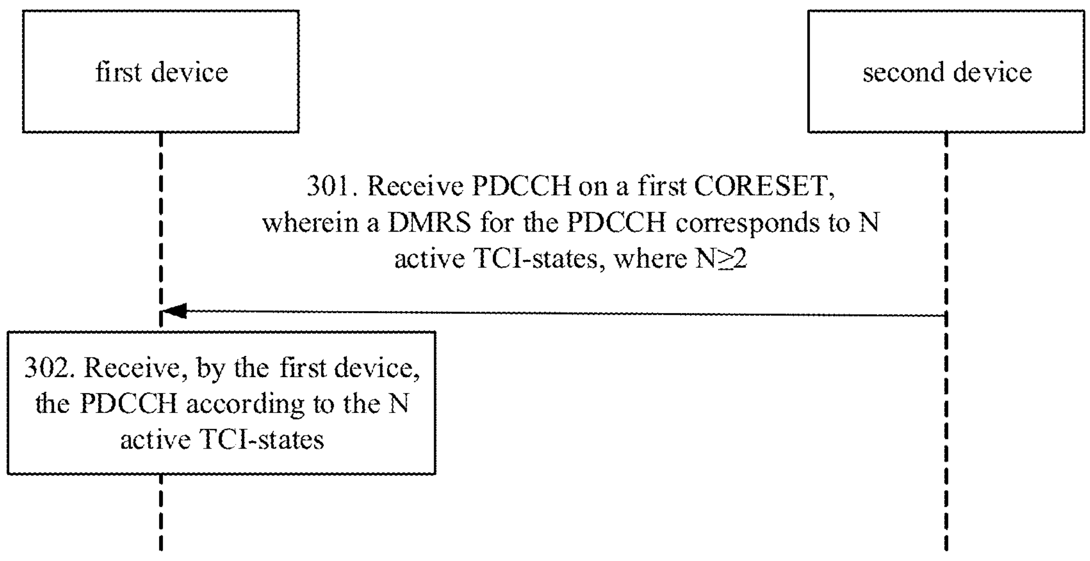
FIG. 3 is a flow chart of transmitting a physical downlink control channel provided by an embodiment of the present disclosure.

Next, on the basis of the above-mentioned FIG. 1, FIG. 2A and FIG. 2B, the method for transmitting the physical downlink control channel provided by embodiments of the present disclosure will be described in detail. Specifically, referring to FIG. 3, FIG. 3 is a flow chart of transmitting a physical downlink control channel provided by an embodiment of the present disclosure. This embodiment is described from the perspective of interaction(s) between a second device and a first device. The embodiment includes:

In 301, the first device receives a Physical Downlink Control Channel (PDCCH) from the second device on a first Control Resource Set (CORESET). A Demodulation reference signal (DMRS) for the PDCCH corresponds to N active Transmission Configuration Indicator-States (TCI-states), where N≥2 and N is an integer.

Exemplarily, the second device is, for example, a network device or a terminal device. When the second device is a terminal device, the aforementioned PDCCH is control channel information transmitted between terminal devices.

The first CORESET includes multiple physical resource blocks in the frequency domain, and includes one or more Orthogonal Frequency Division Multiplexing (OFDM) symbols in the time domain. The first CORESET is, for example, configured by the network for the first device; or, in a scenario such as D2D, the first CORESET is configured by the network or the second device for the first device. While configuring the first CORESET for the first device, the second device configures N active TCI-states for the first CORESET, or the second device may configure the first CORESET for the first device in advance, and then configures N active TCI-states for the first CORESET.

Optionally, in an embodiment of the present disclosure, for example, there are multiple second devices.

Referring to FIG. 2A, in multi-TRP transmission, there are multiple second devices, for example, two or more second devices. Multiple second devices send a PDCCH on the first CORESET. Correspondingly, the first device receives the PDCCH on the first CORESET.

Referring to FIG. 2B, in multi-beam transmission, the second device is, for example, a beam. Two or more beams transmit a PDCCH on the first CORESET. Correspondingly, the first device receives the PDCCH from the second device(s) on the first CORESET.

In addition, in multi-panel transmission, the second device is, for example, a panel. Two or more panels transmit a PDCCH on the first CORESET. Correspondingly, the first device receives the PDCCHs from the second devices on the first CORESET.

In 302, the first device receives the PDCCH according to the N active TCI-states.

After receiving the PDCCH, according to DCI carried by the PDCCH, the first device receives a PDSCH, or sends a PUSCH, and so on.

For a scenario where a terminal device communicates with a network device, the aforementioned first device is for example a terminal device, and the second device is for example a network device. For D2D, V2X, or sidelink communication, the above-mentioned first device and second device are both terminal devices.

In the methods for transmitting the physical downlink control channel provided by the embodiments of the present disclosure, the second device sends the PDCCH on the first CORESET; correspondingly, the first device receives the PDCCH on the first CORESET, and the DMRS for the PDCCH corresponds to N active TCI-states. In this solution, the enhancement of the PDCCH is implemented by using the multi-TRP transmission mode to transmit the PDCCH, thereby improving the performance for the first device to receive the PDCCH.

Optionally, in the foregoing embodiments, the PDCCH corresponds to a first search space, and the first search space is a specific search space USS of the first device.

Exemplarily, the first search space is a specific search space (UE specific search space, USS) of the first device. The search space type of the first search space is configured as ue-Specific.

With this solution, the multi-TRP transmission is configured as the PDCCH transmission in the specific search space of the first device, which can independently allocate single-TRP transmission or multi-TRP transmission for respective first devices, improving the flexibility of the entire communication system.

Optionally, in the foregoing embodiments, the TCI-state includes the following information: a state identity (ID) of the TCI-state used to identify the state of the TCI-state; and first Quasi-co-location (QCL).

Exemplarily, when the first device receives a signal, in order to improve receiving performance, a characteristic of a transmission environment corresponding to data transmission may be used to improve a receiving algorithm. For example, the first device utilizes the statistical characteristic of a channel to optimize the design and a parameter of a channel estimator. In the NR system, the characteristic corresponding to data transmission are represented by QCL information (QCL-Info).

During the downlink transmission, if the downlink transmission comes from different TRPs (beams or panels), the characteristic of the transmission environment corresponding to data transmission may also change. Therefore, in the NR system, when the second device transmits the PDCCH or PDSCH, it indicates the corresponding QCL information to the first device through a TCI-state.

Among the above N active TCI-states, each TCI-state includes the following configurations:

TCI state identity (Identity document, ID) used to identify a TCI state;

first QCL information.

Optionally, among the above N active TCI-states, each TCI-state may further include second QCL information.

Optionally, if the first device is in a high frequency band, the TCI-state in the N active TCI-states includes the first QCL information and the second QCL information, and the first QCL information is used; if the first device is in a low frequency band, the TCI-state in the N active TCI-states only includes the first QCL. For example, in the high frequency band, the QCL type of the first QCL information is QCL-TypeA, and the QCL type of the second QCL information is QCL-TypeD. In the low frequency band, the QCL type of the first QCL is QCL-TypeA.

Each QCL information includes the following information:

QCL type configuration, which may be one of QCL typeA, QCL typeB, QCL typeC or QCL typeD;

QCL reference signal configuration, which includes ID of a cell where the reference signal resides, a Bandwidth Part (BWP) ID, and an identity of the reference signal. The identity of the reference signal is for example a CSI-RS resource ID or an SSB index.

If an active TCI-state includes both the first QCL information and the second QCL information, the QCL type of at least one of the first QCL information and the second QCL information needs to be typeA, typeB or typeC. The QCL type of another piece of QCL information needs to be typeD.

The definitions of different QCL types are as follows:

QCL-typeA: Doppler shift, Doppler spread, average delay, delay spread;

QCL-typeB: Doppler shift, Doppler spread;

QCL-typeC: Doppler shift, average delay;

QCL-typeD: Spatial Rx parameter.

QCL-typeD is used to indicate a beam, and QCL-TypeA, QCL-TypeB, and QCL-TypeC are used to indicate channel statistics, etc.

In the description herein, QCL-TypeA, QCL-TypeB, QCL-TypeC, and QCL-TypeD are often abbreviated as typeA, typeB, typeC, and typeD, respectively.

In the NR system, the network side may indicate a corresponding TCI-state for a downlink signal or downlink channel.

If the network side configures a QCL reference signal of a target downlink channel or a target downlink signal as a Synchronization Signal Block (SSB) through a TCI-state and the QCL type is QCL-typeA, QCL-typeB or QCL-typeC; or, the network side configures a QCL reference signal of a target downlink channel or a target downlink signal as a CSI-RS resource through a TCI-state and the QCL type is QCL-typeA, QCL-typeB or QCL-typeC, in this case, the first device assumes that the large-scale parameters of all target downlink signals and SSB or CSI-RS resource are the same. The large-scale parameter is determined by the QCL type.

If the network side configures a QCL reference signal of a target downlink channel or downlink signal as SSB or CSI-RS resource through a TCI state and the QCL type is typeD, the first device uses a receiving beam which is the same as the receiving beam for receiving the SSB or CSI-RS resource (that is, Spatial Rx parameter) to receive the target downlink signal. Usually, the target downlink channel (or downlink signal) and its SSB or CSI-RS resource are sent by the same TRP or the same panel or the same beam on the network side. If the transmission TRPs or transmission panels or transmission beams of two downlink signals or downlink channels are different, different TCI states are usually configured.

For a downlink control channel, the TCI state(s) for the corresponding CORESET may be indicated through RRC signaling or a combination of RRC signaling and MAC signaling.

In the embodiments of the present disclosure, a TCI-state is used to indicate information related to uplink or downlink transmission configuration. Although the above embodiments are described by taking the TCI-state used for downlink as an example, embodiments of the present disclosure are not limited to this. In other feasible implementations, the TCI-state described in the embodiments of the present disclosure can indicate information related to uplink and downlink transmission configurations at the same time, or TCI-state indicates information related to uplink transmission configuration.

Optionally, in the foregoing embodiments, the PDCCH is transmitted from different beams among the multiple beams, and the different beams among the multiple beams correspond to different TCI-states among the N active TCI-states; or, the PDCCH is transmitted from different transmission and reception points among the multiple transmission and reception points, and different transmission and reception points among the multiple transmission and reception points correspond to different TCI-states among the N TCI-states.

Exemplarily, the PDCCH transmission method provided in the embodiments of the present disclosure can be applied to multi-TRP transmission, multi-beam transmission or multi-panel transmission. Therefore, the PDCCH is transmitted from different TRPs, different beams or different panels. When the PDCCH is transmitted from different TRPs, different TRPs among the multiple TRPs correspond to different active TCI-states among the N active TCI-states. When the PDCCH is transmitted from different beams, different beams among the multiple beams correspond to different active TCI-states among the N active TCI-states. When the PDCCH is transmitted from different panels, different panels among the multiple panels correspond to different active TCI-states among the N active TCI-states.

Optionally, in the above embodiments, the N active TCI-states include a first TCI-state and a second TCI-state, and the Quasi-co-location types in the first TCI-state and the second TCI-state are the same.

For example, the types of QCL information in the first TCI-state and the second TCI-state are both TypeA. For another example, the types of QCL information in the first TCI-state and the second TCI-state include TypeA and TypeD. For another example, the types of the QCL information in the first TCI-state and the second TCI-state both include TypeD.

With this solution, by using the same QCL type, the first device can use a similar processing algorithm to receive signals from different second devices, thereby reducing the implementation complexity of the first device.

Optionally, in the above embodiments, the first CORESET includes multiple physical resource blocks in the frequency domain and one to three OFDM symbols in the time domain, and the first CORESET is associated with at least one search space.

Exemplarily, the second device indicates the transmission of the PDCCH by configuring the first CORESEST. The first CORESEST includes multiple physical resource blocks in the frequency domain and one to three OFDM symbols in the time domain. The time domain resource occupied by the first CORESEST is semi-statically configured by a higher layer parameter. The first CORESET is associated with at least one search space, and the search space is a set of PDCCH candidates under one or more aggregation levels. The aggregation level of the PDCCH actually sent by the second device changes with time, and since there is no relevant signaling to notify the first device, the first device needs to blindly detect the PDCCH at different aggregation levels. The PDCCH to be blindly detected is called a PDCCH candidate. The first device decodes the PDCCH candidate in the search space, and if the Cyclic Redundancy Check (CRC) is passed, it is considered that the content of the decoded PDCCH is valid for the first device, and the information obtained by the decoding is used for subsequent operations.

Optionally, in the foregoing embodiments, the control resource set pool index (coresetPoolIndex) corresponding to the first CORESET is not configured. That is, the field coresetPoolIndex is not configured in related protocols. For example, coresetPoolIndex-r16 is not configured. For details, please refer to the description of related protocols in the third configuration information below. The control resource set pool index is an RRC parameter corresponding to the first CORESET. The benefits of not configuring this RRC parameter are: avoiding the mixed use of multiple schemes, effectively reducing the complexity of signaling configuration, and the implementation complexity of the first device and the second device.

Optionally, in the above embodiments, the Downlink control information (DCI) corresponding to the first CORESET, that is, the indication field of the TCI carried by the PDCCH is at least 1 bit. For example, the indication field of the TCI is 3 bits. In this solution, the TCI state of the scheduled data transmission is indicated through the indication field of the TCI, avoiding complex default QCL assumption rules, and effectively reducing the complexity of the protocol and the implementation complexity of the first device.

Optionally, the above-mentioned DCI carried by the PDCCH is used to schedule a PDSCH or a PUSCH.

Optionally, in the above embodiments, when the DCI carried by the PDCCH is used to schedule the PUSCH, the indication field of the TCI also indicates a spatial domain transmission filter corresponding to the uplink transmission. In this way, the uplink transmission beam is indicated through the indication field of the TCI, and unified uplink and downlink beam indications can be realized, thereby reducing signaling overhead and reducing complexity of the first device.

Optionally, in the above embodiments, the DCI carried by the PDCCH can also schedule SRS or CSI feedback and so on.

Optionally, in the foregoing embodiments, the transmission configuration indication information tci-PresentInDCI corresponding to the first CORESET is in an enable state. That is, tci-PresentInDCI is an RRC parameter corresponding to the first CORESET, and this parameter is in an enable state.

Optionally, in the foregoing embodiments, the transmission configuration indication information tci-PresentInDCI-1-2 corresponding to the first CORESET is in an enable state. That is, tci-PresentInDCI-1-2 is an RRC parameter corresponding to the first CORESET, and this parameter is in an enable state.

Optionally, in the above embodiments, the Bandwidth Part (BWP) of the first device is configured with P CORESETs, where P is an integer, and P is at most 3, or P is at most 5, and the P CORESETs include the first CORESET.

Exemplarily, the number of CORESETs configured by the second device on one BWP for the first device is between 1 and 5. When the maximum value of P is 5, for multi-TRP transmission, the degree of freedom for system optimization is provided by increasing the number of CORESETs, thereby improving the overall performance at the cost of relatively high implementation complexity of the first device and the second device.

When the maximum value of P is 3, the requirement of R15 is followed, avoiding mixed use of the PDCCH scheme based on multi-TRP transmission and the PDSCH scheme based on multi-TRP transmission when the first device receives PDCCH, reducing the implementation complexity of protocols and products.

In the foregoing embodiment, the second device may directly configure N active TCI-states for the first CORESET through first configuration information. For example, FIG. 4 may be referred to (some steps may be omitted).

Figure 4:
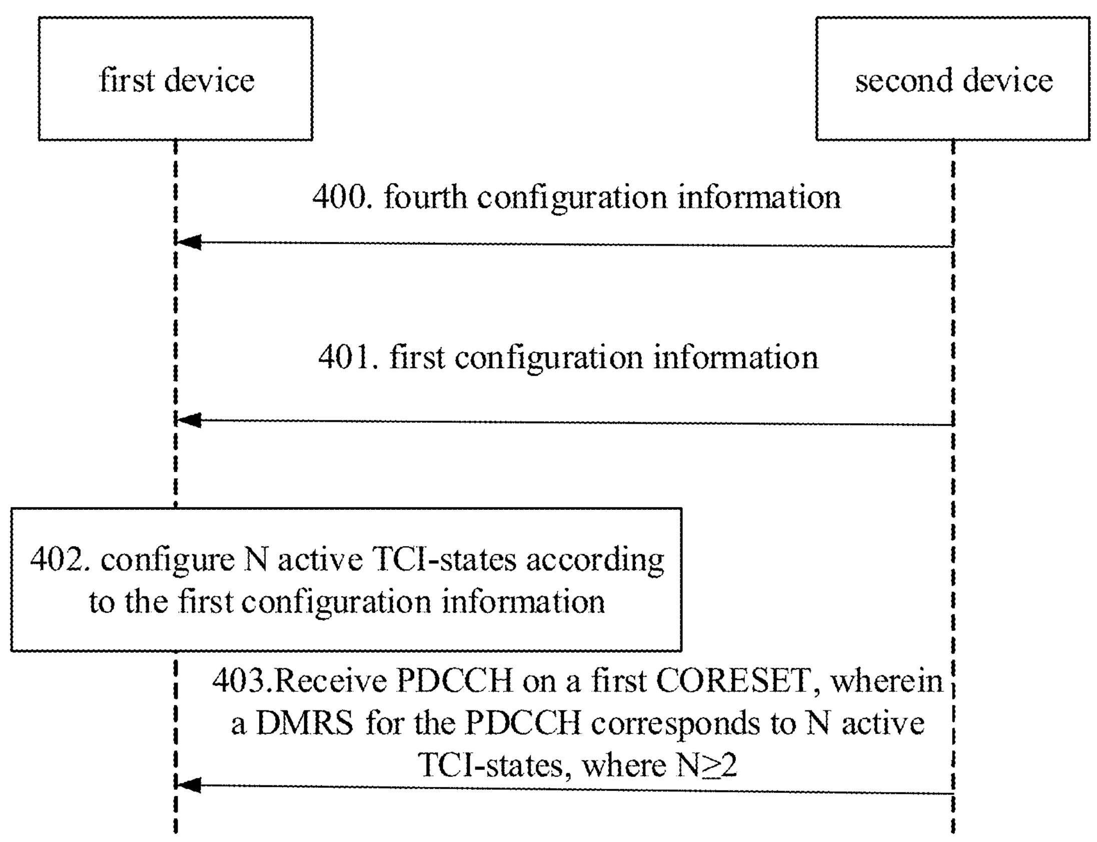
FIG. 4 is another flow chart of transmitting a physical downlink control channel provided by an embodiment of the present disclosure.

FIG. 4 is another flow chart of transmitting a physical downlink control channel provided by an embodiment of the present disclosure. This embodiment includes:

In 401, the first device receives first configuration information from the second device.

Exemplarily, the second device sends the first configuration information to the first device; correspondingly, the first device receives the first configuration information. The first configuration information is carried in RRC signaling, or the first configuration information is RRC signaling.

When the second device is a device in a scenario such as D2D or V2X, the second device can generate the first configuration information, or the second device obtains the first configuration information from the network.

In 402, the first device configures the N active TCI-states for the first CORESET according to the first configuration information.

After the first device receiving the first configuration information for indicating the N active TCI-states, the first device establishes an association relationship between the first CORESET and the N active TCI-states. In one method, the first configuration information indicates time-frequency domain related information of the first CORESET and N active TCI-states at the same time. After receiving the first configuration information, the first device determines a time domain resource and a frequency domain resource corresponding to the first CORESET, and at the same time, the first device determines the N active TCI-states corresponding to the first CORESET.

In another method, the second device configures the first CORESET for the first device in advance, and subsequently configures N active TCI-states for the first CORESET through the first configuration information.

In 403, the first device receives the PDCCH from the second device on the first CORESET.

For details, reference may be made to the description of step 301 above, and repeated descriptions will be omitted here.

With this solution, the second device directly configures N active TCI-states for the first device through the first configuration information, without using additional signaling to activate the TCI-states, thereby reducing signaling overhead.

Referring to the embodiment in FIG. 4, the premise of this embodiment is that the first device also receives fourth configuration information from the second device before receiving the first configuration information from the second device. That is to say, the above-mentioned FIG. 4 further includes:

In 400, the first device receives fourth configuration information from the second device.

The fourth configuration information is used to indicate that the DMRS for the PDCCH corresponds to two active TCI-states.

In the foregoing embodiment, the second device may configure M TCI-states for the first CORESET through the second configuration information, wherein M≥N, or, M>N. For example, reference may be made to FIG. 5.

Figure 5:
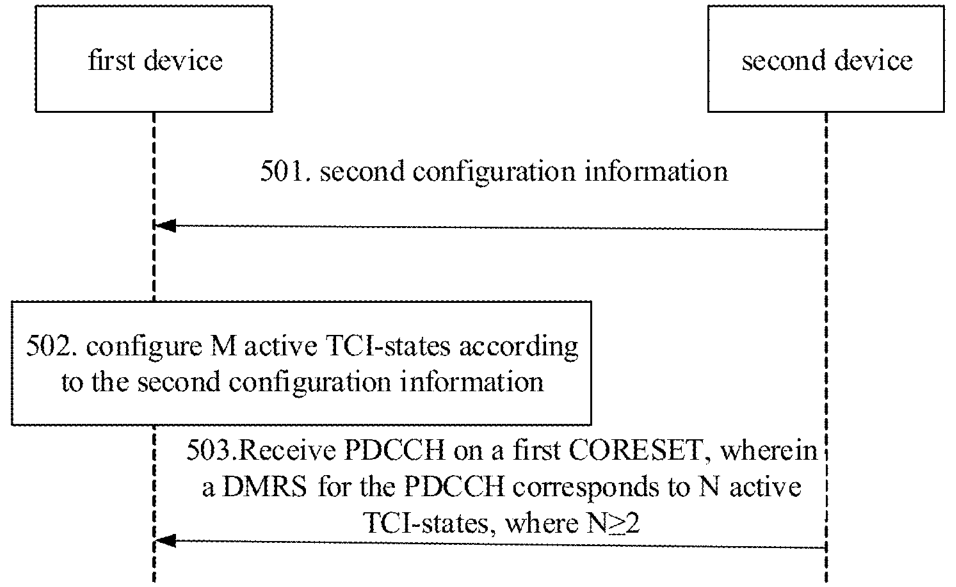
FIG. 5 is another flow chart of transmitting a physical downlink control channel provided by an embodiment of the present disclosure.

FIG. 5 is another flow chart of transmitting a physical downlink control channel provided by an embodiment of the present disclosure. This embodiment includes:

In 501, the first device receives second configuration information from the second device.

Exemplarily, the second device sends the second configuration information to the first device; correspondingly, the first device receives the second configuration information. The second configuration information is carried in RRC signaling, or the first configuration information is RRC signaling.

In 502, the first device configures M TCI-states for the first CORESET according to the second configuration information, where M≥N and M is an integer.

After configuring the M TCI-states, the first device determines the aforementioned N active TCI-states from the M TCI-states.

In 503, the first device receives the PDCCH from the second device on the first CORESET.

For details, reference may be made to the description of step 301 above, and repeated descriptions will be omitted here.

With this solution, the second device directly configures M TCI-states for the first device, and then the second device indicates N active TCI-states among the M TCI-states through other signaling, or the first device determines the aforementioned N TCI-states from the M TCI-states according to position(s) and so on, and this solution has a high degree of flexibility.

Optionally, in the embodiment of FIG. 5 above, after receiving the second configuration information from the second device, the first device further receives first MAC Control Element (MAC CE) signaling, where the first MAC CE signaling is used to indicate the N active TCI-states among the M TCI-states. The first MAC CE carries active TCI-state indication information, which is used to indicate N active TCI-states. The active TCI-state indication information may be the identity (ID) of each TCI-state in the N active TCI-states, or the active TCI-state indication information may be a sequence, and the sequence is used to indicate which TCI-states in the M TCI-states are active TCI-states corresponding to the low CORESET.

The above-mentioned first MAC CE is at least divided into the following two cases: (taking N=2 as an example), in one case, the first MAC CE contains one or more of the following pieces of information:

A. Serving cell indication information, used to indicate a serving cell corresponding to the first MAC CE signaling. For example, it is 5 bits. If the serving cell belongs to a cell set and the cell set supports updating TCI-state at the same time, the first MAC CE signaling is applicable to all cells in the cell set.

B. CORESET indication information, used to indicate a CORESET corresponding to the first MAC CE signaling. Optionally, the CORESET indication information is, for example, 4 bits.

C. First indication information used to indicate an active TCI-state among the N active TCI-states. Optionally, the first indication information is, for example, 7 bits.

D. Second indication information used to indicate another active TCI-state among the N active TCI-states. Optionally, the second indication information is, for example, 7 bits.

Optionally, the first indication information is further used to indicate whether the first MAC CE signaling includes the second indication information. In this way, the first device can determine whether the second indication information exists according to the content of the first indication information.

In the above embodiment, taking N=2 as an example, the active TCI-state indication information includes first indication information and second indication information, and two active TCI-states are indicated by the first indication information and the second indication information. In addition, the N active TCI-states may also be implemented through a bitmap in the first MAC CE signaling. For example, when a bit in the bitmap takes a value of 1, it indicates activation of a corresponding TCI-state. Assuming M=5, N=2, the third and fourth TCI-states are active TCI-states corresponding to the first CORESET, and the first MAC CE carries a sequence “00110”. The first device can determine the N active TCI-states from the M TCI-states according to the sequence “00110”. This method may not only be used in this embodiment, but may also be similarly used in other embodiments herein, and details will not be repeated hereafter.

In the embodiment of FIG. 5 above, if the second device sends the fourth configuration information to the first device before the second device sends the first MAC CE to the first device, the first MAC CE signaling includes the second indication information; if the second device does not send the fourth configuration information to the first device before the second device sends the first MAC CE to the first device, the first MAC CE does not include the second indication information. That is to say, if the second device sends the fourth configuration information to the first device, the first MAC CE signaling indicates two active TCI-states for the first CORESET; if the second device does not send the fourth configuration information to the first device information, the first MAC CE signaling indicates one active TCI-state for the first CORESET.

In another case, the first MAC CE contains one or more of the following pieces of information:

A. Serving cell indication information, used to indicate a serving cell corresponding to the first MAC CE signaling. For example, it is 5 bits. If the serving cell belongs to a cell set and the cell set supports updating TCI-state at the same time, the first MAC CE signaling is applicable to all cells in the cell set.

B. CORESET indication information, used to indicate a first CORESET corresponding to the first MAC CE signaling. Optionally, the first CORESET indication information is, for example, 4 bits.

C. First indication information used to indicate an active TCI-state among the N active TCI-states. Optionally, the first indication information is, for example, 7 bits.

D. Second indication information used to indicate another active TCI-state among the N active TCI-states. Optionally, the second indication information is, for example, 7 bits.

E. A flag used to indicate whether the first MAC CE signaling includes the second indication information.

Optionally, in the above embodiment, the first MAC CE signaling is further used to indicate an active TCI-state for at least one second CORESET, and the first MAC CE signaling further includes one or more of the following pieces of information:

F. CORESET number used to indicate the number of the at least one second CORESET and the first CORESET. That is to say, the first MAC CE signaling indicates the active TCI-states for multiple CORESETs.

G. CORESET indication information, used to indicate at least one second CORESET. For example, the CORESET indication information includes an identity of each CORE- SET in one or more second CORESETs, and each CORESET ID is for example 4 bits. When the number of the second CORESET(s) is relatively small, the number of occupied bits is relatively small. For another example, the CORESET indication information is represented by a bitmap, and the bitmap is used to indicate one or more second CORESETs. When the number of the second CORESET(s) is relatively large, the number of occupied bits used for indicating the CORESETs using the bitmap is relatively small.

Optionally, the bitmap is, for example, 16 bits. In this solution, since the size of the bitmap is fixed, the protocol design and product implementation are simple.

Optionally, when the number of CORESETs configured in the serving cell is less than or equal to 8, the bitmap is 8 bits. When the number of CORESETs configured in the serving cell is greater than 8, the bitmap is 16 bits. The configured CORESETs include CORESET 0, and CORESET 0 is a CORESET with an identity of 0. The configured CORESETs include the above-mentioned first CORESET and at least one second CORESET. In this way, the first device can determine the size of the bitmap according to the number of configured CORESETs, which can reduce the signaling overhead of the first MAC CE.

Optionally, when the number of CORESETs configured in the serving cell is less than or equal to 8, the bitmap is 8 bits. When the number of at least one second CORESET configured in the serving cell is greater than 8, the bitmap is 16 bits. The configured CORESETs do not include CORESET 0. In this way, the first device can determine the number of the second CORESET(s) according to the number of configured CORESETs, which can reduce the signaling overhead of the first MAC CE.

H. Third indication information for each second CORESET, used to indicate an active TCI-state for the second CORESET; for example, the third indication information is 7 bits;

I. Fourth indication information for each second CORESET used to indicate another active TCI-state for the second CORESET; for example, the fourth indication information is 7 bits.

J. Fifth indication information, used to indicate whether the fourth indication information exists in the first MAC CE.

Optionally, in the foregoing embodiments, the second device may configure K TCI-state groups for the first CORESET through third configuration information.

Exemplarily, before receiving the PDCCH from the second device on the first CORESET, the first device further receives the third configuration information from the second device, and then configures K TCI-state groups for the first CORESET according to the third configuration information. Each TCI-state group in one or more TCI-state groups in the K TCI-state groups corresponds to the N active TCI-states, K≥1 and K is an integer.

Exemplarily, the second device sends the third configuration information to the first device; correspondingly, the first device receives the third configuration information. The third configuration information is carried in RRC signaling, or the third configuration information is RRC signaling. After receiving the third configuration information, the first device configures K TCI-state groups for the first CORESET. Among the K TCI-state groups, each TCI-state group in one or more TCI-state groups corresponds to N active TCI-states. In this solution, configuring the TCI-state groups through RRC signaling can reduce MAC CE signaling overhead.

When the first device receives the third configuration information, the first device can determine N active TCI-states using at least two methods.

In one method, in the foregoing embodiments, the third configuration information indicates N TCI-state lists, and the TCI-states at corresponding positions in the N TCI-state lists form the TCI-state group.

For example, the third configuration information indicates two TCI-state lists, and the two TCI-state lists indicate X1 TCI-states and X2 TCI-states, respectively, and X2<X1. The first X2 TCI-states in the first TCI-state list are in one-to-one correspondence with the first X2 TCI-states in the second TCI-state list to form a group.

An example of the third configuration information is as follows: taking the existing RRC parameter(s) as a starting point, corresponding modifications are made, and a new field such as TCI-statePDCCH-ToAddlist2 is added. The name of the newly added field may be another name, which is not limited in the embodiments of the present disclosure. The relevant protocol is as follows:

```
-- ASN1START
-- TAG-CONTROLRESOURCESET-START
ControlResourceSet ::=                SEQUENCE {
controlResourceSetId                ControlResourceSetId,
frequencyDomainResources              BIT STRING (SIZE (45)),
    duration                            INTEGER (1..maxCoReSetDuration),
    cce-REG-MappingType                   CHOICE {
      interleaved                           SEQUENCE {
      reg-BundleSize                          ENUMERATED {n2, n3, n6},
      interleaverSize                       ENUMERATED {n2, n3, n6},
shiftIndexINTEGER(0..maxNrofPhysicalResourceBlocks-1) Optional -- Need S
    },
    nonInterleaved                        NULL
  },
  precoderGranularity ENUMERATED {sameAsREG-bundle, allContiguousRBs},
  tci-StatesPDCCH-ToAddList         SEQUENCE(SIZE (1..maxNrofTCI-StatesPDCCH)) OF TCI-
StateId OPTIONAL, -- Cond NotSIB1-initialBWP
  tci-StatesPDCCH-ToReleaseLis SEQUENCE(SIZE (1..maxNrofTCI-StatesPDCCH)) OF TCI-
StateId OPTIONAL, -- Cond NotSIB1-initialBWP
```

-continued

```
      tci-PresentInDCI ENUMERATED{enabled} PTIONAL, -- Need S pdcch-DMRS-ScramblingID
   INTEGER(0..65535)           OPTIONAL, -- Need S
     ...,
     [[
      rb-Offset-r16        INTEGER(0..5)    OPTIONAL, -- Need S
   tci-PresentDCI-1-2-r16     INTEGER(1..3)    OPTIONAL, -- Need     S          controlResourceSetId-v1610
   coresetPoolIndex-r16     INTEGER(0..1)    OPTIONAL, -- Need S
ControlResourceSetId-v1610 OPTIONAL -- Need S
   ]]
   tci-StatesPDCCH-ToAddList2 SEQUENCE(SIZE (1..maxNrofTCI-StatesPDCCH)) OF TCI-StateId
OPTIONAL,
   }
   -- TAG-CONTROLRESOURCESET-STOP
- ASN1STOP
```

In another method, in the above embodiments, the first device further receives second MAC CE signaling from the second device, and the second MAC CE signaling is used to indicate a first TCI-state group in the K TCI-state group, where the first TCI-state group corresponds to the N active TCI-states.

In this method, the second device indicates one TCI-state group (that is, the first TCI-state group) corresponding to the first CORESET through the second MAC CE signaling. The TCI-state group corresponds to the above N active TCI-states. Optionally, the second MAC CE signaling may further indicate one active TCI-state corresponding to the first CORESET. After receiving the second MAC CE signaling, the first device determines the position of one active CTI-state in the first TCI-state list, and according to the position, the first device determines the second active TCI-state list from the second TCI-state list.

Optionally, in the above embodiments, when the PDCCH is used to schedule a PDSCH, if a scheduling offset is greater than a first threshold and the PDSCH does not carry TCI indication information, the first device receives the PDSCH according to the N active TCI-states.

Exemplarily, assuming N=2, if the scheduling offset is greater than the first threshold and the PDSCH does not carry TCI indication information, the first device receives the PDSCH according to the two active TCI-states corresponding to the first CORESET. In this solution, since data needs to be buffered according to two QCL assumptions, the complexity is relatively large, but the receiving performance of the first device can be improved. The first threshold is determined by the first device according to reported capability information; or, the first threshold is configured by the network; or, the first threshold is a predetermined value.

Optionally, in the above embodiments, when the PDCCH is used to schedule a PDSCH, if the scheduling offset is greater than the first threshold and the PDSCH does not carry TCI indication information, the first device receives the PDSCH according to a first TCI-state in the N active TCI-states. In this solution, since the first device only needs to buffer data according to one QCL assumption, the implementation complexity of the first device can be reduced.

Optionally, the first device determines the first TCI-state according to the identity of each TCI-state in the N active TCI-states. For example, the first TCI-state is a TCI-state with the largest TCI-state ID among the N active TCI-states. For another example, the first TCI-state is a TCI-state with the smallest TCI-state ID among the N active TCI-states.

Optionally, the first device may also determine the first TCI-state according to the position of each TCI-state among the N active TCI-states in the first MAC CE signaling. For example, the first TCI-state is a TCI-state which has a forward position among the N active TCI-states.

Optionally, the first device may also determine the first TCI-state according to the position of each TCI-state among the N active TCI-states in the first configuration information. For example, the first TCI-state is a TCI-state which has a forward position among the N active TCI-states.

Optionally, in the foregoing embodiments, when the PDCCH is used to schedule a PDSCH, the scheduling offset is greater than, or greater than or equal to the first threshold.

Optionally, in the above embodiments, when the PDCCH is used to schedule a PDSCH, if the scheduling offset is smaller than the first threshold and the first device needs to determine the QCL assumption related to PDSCH reception according to the first CORESET, the first device receives the PDSCH according to the N active TCI-states. In this solution, since data needs to be buffered according to two QCL assumptions, the complexity is relatively large, but the receiving performance of the first device can be improved.

Optionally, in the above embodiments, when the PDCCH is used to schedule a PDSCH, if the scheduling offset is smaller than the first threshold and the first device needs to determine the QCL assumption related to PDSCH reception according to the first CORESET, the first device schedules the PDSCH according to the first TCI-state among the N active TCI-states. In this solution, since the first device only needs to buffer data according to one QCL assumption, the implementation complexity of the first device can be reduced.

Optionally, the first device determines the first TCI-state according to an identity of each TCI-state in the N active TCI-states. For example, the first TCI-state is a TCI-state with the largest TCI-state ID among the N active TCI-states. For another example, the first TCI-state is a TCI-state with the smallest TCI-state ID among the N active TCI-states.

Optionally, the first device may also determine the first TCI-state according to the position of each TCI-state among the N active TCI-states in the first MAC CE signaling. For example, the first TCI-state is a TCI-state which has a forward position among the N active TCI-states.

Optionally, the first device may also determine the first TCI-state according to the position of each TCI-state among the N active TCI-states in the first configuration information. For example, the first TCI-state is a TCI-state which has a forward position among the N active TCI-states.

In the above embodiments, the first device receives fourth configuration information from the second device, and the fourth configuration information is used to indicate that a DMRS for at least part of the PDCCH(s) received by the first device corresponds to N active TCI-states. For example, some PDCCH DMRSs correspond to N active TCI-states, and some PDCCH DMRSs correspond to one active TCI-state. For another example, DMRSs of all PDCCHs correspond to N active TCI-states. In this solution, the PDCCH transmission mode is configured through explicit signaling, avoiding the situation where the first device implicitly determines the PDCCH transmission mode through a complex rule. This solution can reduce the difficulty of protocol design and reduce the implementation complexity of the network side and the terminal side.

Optionally, in the above embodiments, the fourth configuration information and the first configuration information are carried in the same signaling, or the fourth configuration information and the first configuration information are the same signaling, so as to reduce signaling overhead.

Optionally, in the above embodiments, the fourth configuration information and the second configuration information are carried in the same signaling, or the fourth configuration information and the second configuration information are the same signaling, so as to reduce signaling overhead.

Optionally, in the above embodiments, the fourth configuration information and the third configuration information are carried in the same signaling, or the fourth configuration information and the third configuration information are the same signaling, so as to reduce signaling overhead.

Optionally, the second device sends the fourth configuration information to the first device before sending the PDCCH on the first CORESET. Correspondingly, the first device receives the fourth configuration information from the second device before receiving the PDCCH from the second device on the first CORESET.

Optionally, in the foregoing embodiments, the first device further sends capability information to the second device. The capability information is used to indicate that the first device supports receiving a PDCCH corresponding to N active TCI-states. That is, the capability information is used to indicate that the first device supports reception of the following PDCCH: a DMRS for a PDCCH corresponds to N active TCI-states; or, the first CORESET corresponding to the PDCCH corresponds to N active TCI-states.

With this solution, each first device independently reports its own capability information to the second device, and configures the PDCCH transmission mode through explicit signaling, avoiding the situation that the first device implicitly determines the PDCCH transmission mode through a complicated rule. This solution can reduce the difficulty of protocol design and at the same time reduce the implementation complexity of the network side and the terminal side.

Optionally, in the foregoing embodiments, the capability information is carried in capability signaling (UE capability signaling) of the first device.

Optionally, in the above embodiments, the capability information is carried in the Radio Resource Control (RRC) signaling or the Medium Access Control Control Element (MAC CE) signaling.

Optionally, in the foregoing embodiments, when the first device sends the capability information to the second device, the first device sends the capability information to the second device per frequency band.

Exemplarily, the first device reports corresponding capability information per frequency band. That is, the first device independently reports corresponding capability information on different frequency bands, and the capability information corresponding to each frequency band (per band) may be different. For example, the first device reports the above capability information on a certain frequency band or some frequency bands, indicating that the first device supports receiving PDCCHs corresponding to N active TCI-states on the frequency band(s). For another example, the first device does not report the above capability information on a certain frequency band or some frequency bands, meaning that the first device does not support receiving PDCCHs corresponding to N active TCI-states on the frequency band(s).

In this solution, the first device independently reports capability information on different frequency bands, so that the first device has greater degrees of freedom.

Optionally, in the foregoing embodiments, when the first device sends capability information to the second device, the first device sends the capability information to the second device per frequency band combination.

Exemplarily, the first device reports corresponding capability information per frequency band combination. That is, the first device independently reports corresponding capability information for different frequency band combinations, and the capability information corresponding to different frequency band combinations may be different. For example, if the first device does not support receiving PDCCHs corresponding to N active TCI-states under a certain Carrier Aggregation (CA), the first device does not report the above capability information for the CA. For another example, if the first device supports receiving PDCCHs corresponding to N active TCI-states under a certain CA, the first device reports the above capability information for the CA.

Optionally, in the above embodiments, when the first device sends capability information to the second device, the first device sends the capability information to the second device per frequency band per frequency band combination.

Exemplarily, the first device reports corresponding capability information per frequency band per frequency band combination. That is, the first device independently reports corresponding capability information for different frequency bands in different frequency band combinations, and the capability information corresponding to different frequency band combinations can be different. For example, a frequency band combination includes frequency band 1 to frequency band 3, and the first device reports the above capability information for frequency band 1 and frequency band 2 in the frequency band combination, indicating that the first device supports receiving PDCCHs corresponding N active TCI-states on frequency band 1 and frequency band 2, and the first device does not support receiving PDCCHs corresponding to N active TCI-states on frequency band 3.

Next, taking N=2 as an example, the above method for transmitting the physical downlink control channel will be described in detail.

Figure 6:
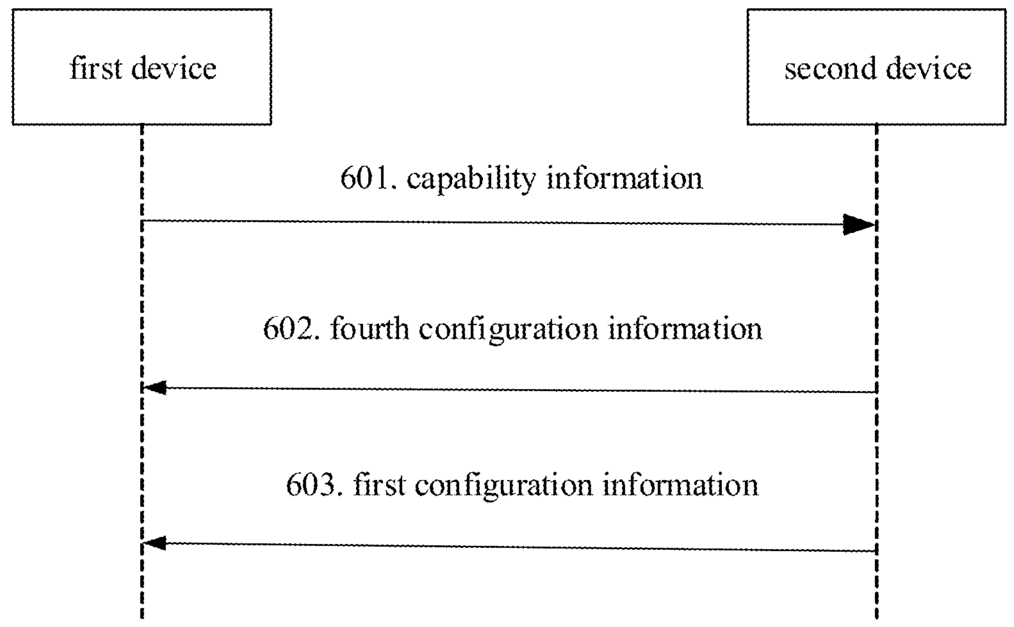
FIG. 6 is a flow chart of transmitting a physical downlink control channel provided by an embodiment of the present disclosure.

FIG. 6 is a flow chart of transmitting a physical downlink control channel provided by an embodiment of the present disclosure. In this embodiment, the second device configures two active TCI-states for the first CORESET through the first configuration information. This example includes:

In 601, the first device sends capability information to the second device.

Exemplarily, after the first device accesses the network and enters an RRC connected state (RRC connect mode), the first device sends capability information to the second device through terminal capability signaling such as RRC signaling. The capability information indicates that the first device is capable of receiving one PDCCH, and the DMRS of the PDCCH corresponds to two active TCI-states. Or, the first CORESET of the PDCCH corresponds to two active TCI-states. That is to say, the first device can obtain a corresponding QCL assumption (quasi co-location assumption) according to the two active TCI-states to receive the PDCCH and the DMRS of the PDCCH.

Optionally, the first device may independently report the above capability information respective frequency band(s). That is, the first device supports this feature in some frequency band(s) and does not support this feature in some frequency band(s).

Optionally, the first device may report the above capability information for different frequency band combinations. That is, for some frequency band combinations, the first device supports this feature, and for some other frequency band combinations, the first device does not support this feature.

Optionally, the first device may also report the above capability information for different frequency bands in a frequency band combination. That is, for a frequency band combination, the first device supports this feature on a certain frequency band or some frequency bands in the frequency band combination, and does not support this feature on other frequency bands in the frequency band combination.

In the above FIG. 6, the method further includes:

In 602, the first device receives fourth configuration information from the second device.

Exemplarily, step 602 may be performed before or after step 601. The fourth configuration information is used to indicate that one PDCCH DMRS corresponds to two active TCI-states. Alternatively, the fourth configuration information is used to indicate that the CORESET corresponding to one PDCCH corresponds to two active TCI-states. That is to say, the fourth configuration information is used to tell the first device to enter a new PDCCH transmission scheme.

In 603, the second device sends the first configuration information to the first device.

After the first device receives the fourth configuration information, if the second device sends the first configuration information to the first device, the first device receives the first configuration information, and configures the first CORESET and other CORESETs according to the first configuration information. The first CORESET corresponds to two active TCI-states.

When the first device receives the PDCCH from the second device on the first CORESET, the two TCI-states of the first CORESET are active. That is, if a PDCCH is transmitted in the first CORESET, the first terminal device receives the PDCCH according to QCL assumptions corresponding to the two active TCI-states.

Optionally, the two active TCI-states are configured with the same QCL type. For example, the two active TCI-states are both configured with QCL-TypeA, or are both configured with QCL-TypeA and QCL-TypeD, or are both configured with QCL-TypeD.

Optionally, the above PDCCH corresponds to a UE-specific search space.

Optionally, the second device sends a PDCCH to the first device on the same time domain resource and frequency domain resource from two TRPs. The above two active TCI-states correspond to transmissions on the two TRPs, respectively.

Optionally, the above RRC parameter coresetPoolIndex corresponding to the first CORESET is not configured.

Optionally, the number of bits in the tci indication field in the above PDCCH is greater than 0, for example, 3 bits.

Optionally, the RRC parameter tci-PresentInDCI corresponding to the first CORESET is configured as enabled.

Optionally, the RRC parameter tci-PresentInDCI-1-2 corresponding to the first CORESET is configured as enabled.

Figure 7:
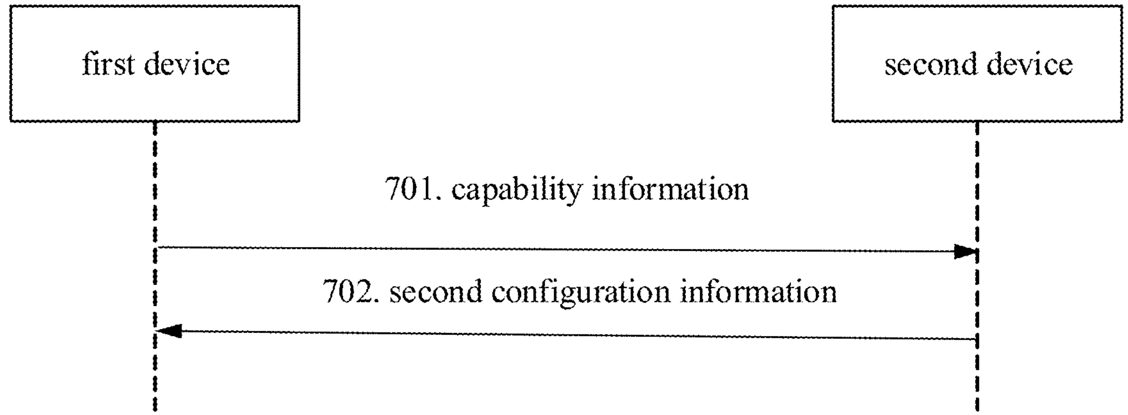
FIG. 7 is another flow chart of transmitting a physical downlink control channel provided in an embodiment of the present disclosure.

FIG. 7 is another flow chart for transmitting a physical downlink control channel provided by an embodiment of the present disclosure. In this embodiment, the second device configures M TCI-states for the first CORESET through the second configuration information, wherein M≥N; or, M>N. This example includes:

In 701, the first device sends capability information to the second device.

For details, reference may be made to the description of step 601 in FIG. 6 above, which will not be repeated here.

In 702, the first device receives second configuration information from the second device.

After receiving the second configuration information, the second device determines two active TCI-states from the M TCI-states. For example, two active TCI-states are randomly selected.

For another example, after step 702, the second device sends first MAC CE signaling to the first device, where the first MAC CE signaling is used to indicate the two active TCI-states corresponding to the first CORESET.

Figure 8:
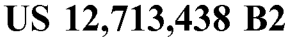
FIG. 8 is a schematic diagram of first MAC CE signaling in a method for transmitting a physical downlink control channel provided by an embodiment of the present disclosure.
Figure 8:
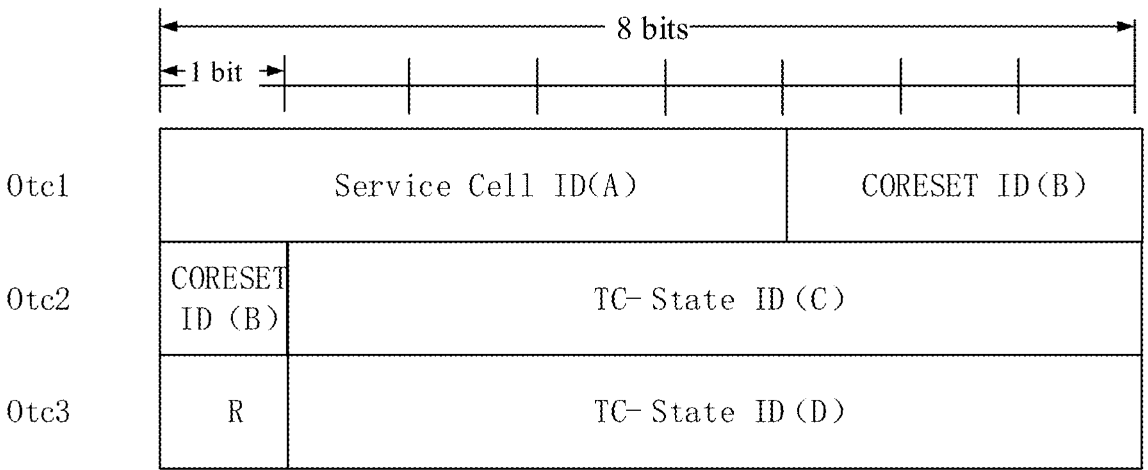
Figure 9:
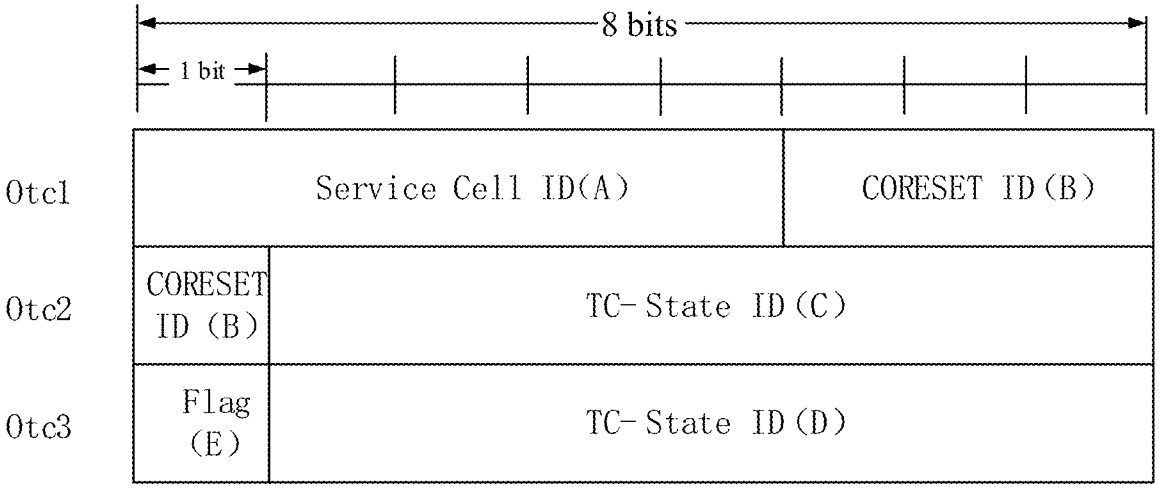
FIG. 9 is another schematic diagram of first MAC CE signaling in a method for transmitting a physical downlink control channel provided by an embodiment of the present disclosure.

For examples of the first MAC CE signaling, reference may be made to FIG. 8 and FIG. 9.

FIG. 8 is a schematic diagram of first MAC CE signaling in the method for transmitting a physical downlink control channel provided by an embodiment of the present disclosure. Referring to FIG. 8, the first MAC CE signaling carries serving cell indication information, indication information of a CORESET, first indication information, second indication information, and a reserved bit (Reserve, R). The serving cell indication information is for example the Serving Cell ID in the figure, and for example, the serving cell indication information is 5 bits. The CORESET indication information is for example CORESET ID, and for example, the CORESET indication information is 4 bits, and the 4 bits include 3 bits in the first row (Oct1) and 1 bit in the second row (Oct2). The first indication information is for example the TCI State ID in the second row (Oct2). The second indication information is for example the TCI State ID in the third row (Oct3). The first indication information and the second indication information are 7 bits each. The pieces of information carried in the first MAC CE signaling are located in different positions in the first MAC CE signaling, and these positions can be exchanged. For example, positions of the TCI State ID and R in the third row (Otc3) can be exchanged.

Optionally, the first device determines whether the second indication information exists in the third row according to the fourth configuration information. If the second device sends the fourth configuration information to the first device, the second indication information exists in the third row of the first MAC CE signaling; if the second device does not send the fourth configuration information to the first device, there is no second indication information in the third row of the first MAC CE signaling. With this solution, the first device determines the size of the first MAC CE according to the fourth configuration information, and knows the signaling format of the first MAC CE in advance, thereby reducing the implementation complexity of the first device.

In addition, the first device may also determine whether there is second indication information according to the first indication information in the second row (Oct2). For example, if the TCI-state ID indicated by the first indication information in the second row (Oct2) in FIG. 8 is greater than or equal to 64, the second indication information in the third row in the first MAC CE signaling exists. If the TCI-state ID indicated by the first indication information in the second row (Oct2) in FIG. 8 is less than 64, the second indication information in the third row in the first MAC CE signaling does not exist. When the first device determines that the second indication information in the third row in the first MAC CE signaling exists, the first device subtracts 64 from the value corresponding to the TCI-state ID indicated by the first indication information in the second row (Oct2) to obtain a difference value, and determines the TCI-state indicated by the second indication information according to the difference value. With this solution, the first device can determine whether the second indication information exists according to the first MAC CE signaling, without the second device sending the fourth configuration information to the first device, thereby saving signaling overhead.

FIG. 9 is another schematic diagram of first MAC CE signaling in the method for transmitting a physical downlink control channel provided by an embodiment of the present disclosure. Referring to FIG. 9, the first MAC CE signaling carries serving cell indication information, indication information of a CORESET, first indication information, second indication information, and a flag. The serving cell indication information is for example the Serving Cell ID in the figure. The CORESET indication information is for example the CORESET ID, and for example, the CORESET indication information is 5 bits. The CORESET indication information is for example the CORESET ID, and for example, the CORESET indication is 4 bits, and the 4 bits include 3 bits in the first row (Oct1) and 1 bit in the second row (Oct2). The first indication information is for example the TCI State ID in the second row (Oct2). The second indication information is for example the TCI State ID in the third row (Oct3). Each of the first indication information and the second indication information has 7 bits. The pieces of information carried in the first MAC CE signaling are located in different positions in the first MAC CE signaling, and these positions can be exchanged. For example, positions of the serving cell indication information and the CORESET indication information in the first row (Otc1) can be exchanged.

The first device determines whether there is second indication information according to the flag in the third row (Oct3). For example, when flag is 1, it means that there is second indication information in the third row of the first MAC CE signaling; when flag is 0, it means that there is no second indication information in the third row of the first MAC CE signaling. For another example, when flag is 1, it means that there is no second indication information in the third row of the first MAC CE signaling; when flag is 0, it means that there is second indication information in the third row of the first MAC CE signaling.

With this solution, a flag is used to indicate whether there is second indication information in the third row of the first MAC CE signaling, so that the format of the first MAC CE can also support the traditional situation where only one TCI-state is activated.

Figure 11:
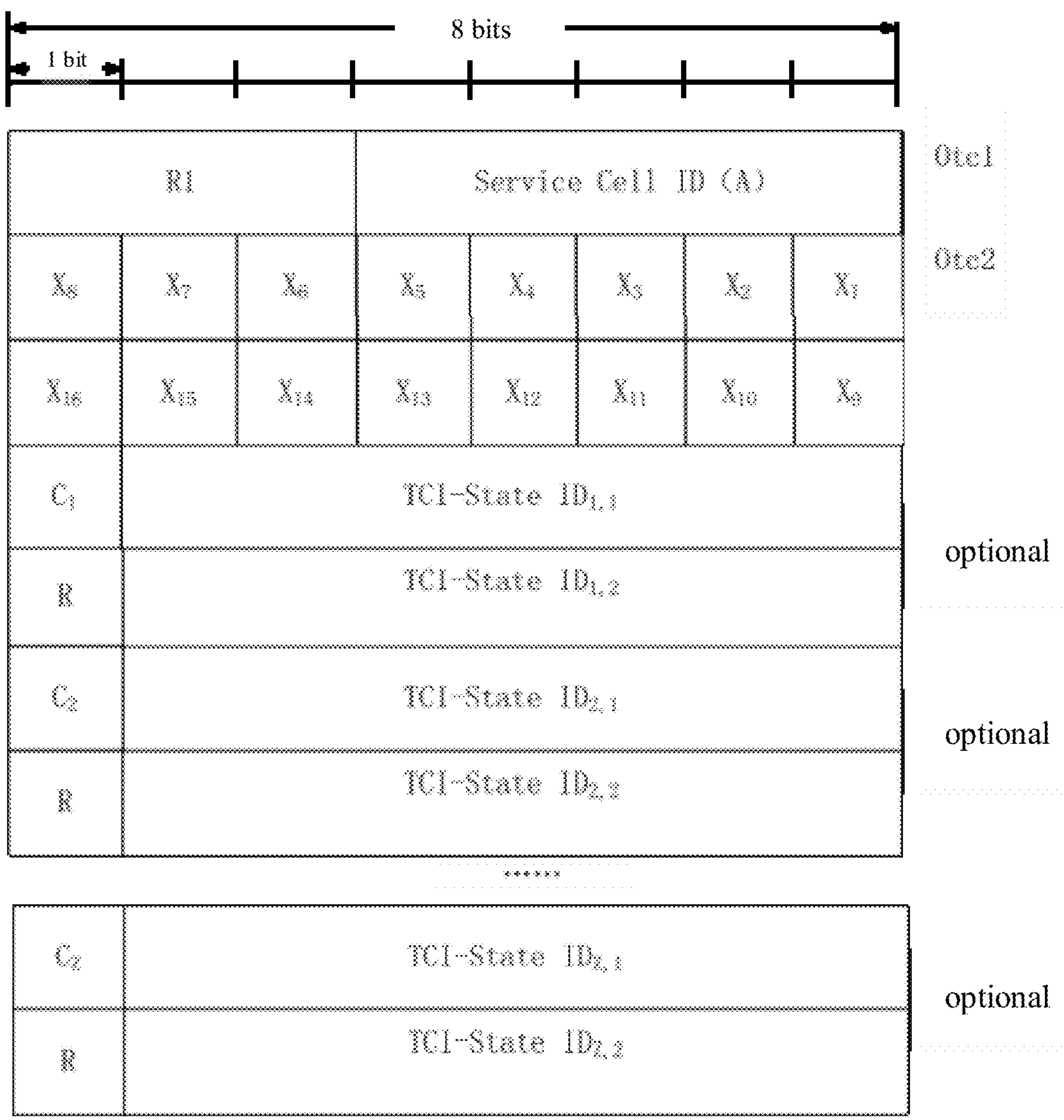
FIG. 11 is another schematic diagram of first MAC CE signaling in a method for transmitting a physical downlink control channel provided by an embodiment of the present disclosure.

Optionally, in the foregoing embodiments, the first MAC CE signaling is further used to indicate an active TCI-state for at least one second CORESET. In this case, examples of the first MAC CE are shown in FIG. 10 and FIG. 11.

FIG. 10 is another schematic diagram of the first MAC CE signaling in the method for transmitting a physical downlink control channel provided by an embodiment of the present disclosure. Referring to FIG. 10, the first MAC CE signaling carries serving cell indication information, the number of CORESET(s), indication information of one or more CORESETs, and indication information of an active TCI-state for each CORESET in the one or more CORESETs. The pieces of information carried in the first MAC CE signaling are located in different positions in the first MAC CE signaling, and these positions can be exchanged. For example, positions of the Service Cell ID and number of CORESET in the first row (Otc1) can be exchanged.

The serving cell indication information is for example the Service Cell ID in the figure, and is used to indicate the serving cell corresponding to the first MAC CE signaling. For example, the serving cell indication information is 5 bits. If the serving cell belongs to a cell set and the cell set supports updating TCI-state at the same time, the first MAC CE signaling is applicable to all cells in the cell set.

The number of CORESET(s), such as the number of CORESETs (F) in the figure, indicates how many CORESETs for which active TCI-state are indicated by the first MAC CE signaling. In FIG. 10, the number of CORESETs is for example Z, and Z is an even number.

Indication information of one or more CORESET, such as the CORESET ID in the figure, is used to indicate which CORESET or CORESETs the first MAC CE signaling is directed to. Each CORESET ID indicated by the indication information of one or more CORESET is for example 4 bits. In FIG. 10, taking Z being an even number as an example, ID information of Z CORESETs are indicated in total. Among them, CORESET ID1 (B) represents the first CORESET, and CORESET ID2 (G) to CORESET IDZ (G) represent the second CORESETs.

For each CORESET, taking CORESETID1 as an example, the active TCI-states of CORESET ID1 are TCI-State $ID_{1,1}$ and TCI-State $ID_{1,2}$. Each active TCI-state ID of CORESETID1 is for example 7 bits.

In FIG. 10, R represents a reserved bit. $C_1$-$C_z$ indicate whether the second active TCI-state for each CORESET in CORESET ID 1-CORESET ID Z exists. Taking CORESET ID 2 as an example, if $C_2$ is 1, it means that there is a second active TCI-state for CORESET ID 2. If $C_2$ is 0, it means that there is no second active TCI-state for CORESET ID 2. By adopting this solution, bits can be saved, and signaling overhead of the first MAC CE can be reduced.

In addition, if $C_2$ is 0, it can also indicate that the bit corresponding to TCI-state $ID_{1,2}$ are not applicable, so as to avoid the existence or non-existence of some fields that cause the size of the first MAC CE signaling to change, reducing the product implementation complexity.

FIG. 11 is another schematic diagram of the first MAC CE signaling in the method for transmitting a physical downlink control channel provided by an embodiment of the present disclosure. Referring to FIG. 11, the first MAC CE signaling carries serving cell indication information, indication information of one or more CORESETs, and indication information of an active TCI-state for each CORESET in the one or more CORESETs. The pieces of information carried in the first MAC CE signaling are located in different positions in the first MAC CE signaling, and these positions can be exchanged. For example, the positions of the Service Cell ID and the reserved bit 1 (reserve1, R1) of the first row (Otc1) can be exchanged.

The serving cell indication information is for example the Service Cell ID in the figure, and is used to indicate the serving cell corresponding to the first MAC CE signaling. For example, the serving cell indication information is 5 bits. If the serving cell belongs to a cell set and the cell set supports updating TCI-state at the same time, the first MAC CE signaling is applicable to all cells in the cell set.

The indication information of one or more CORESETs is used to indicate which CORESET or CORESETs the first MAC CE signaling is directed to. In FIG. 10, the indication information of one or more CORESETs is indicated by a 16-bit bitmap, and the 16-bit bitmap is shown as $X_1$-$X_{16}$ in the second row and the third row in the figure. Assuming that among the 16 bits, $X_1$, $X_3$ and $X_{12}$ are 1, and the rest bits are 0, it means that the first MAC CE signaling indicates an active TCI-state for 3 CORESETs.

In addition, the bitmap may be 8 bits or the like. When the value of a certain bit is 1, it means that the first MAC CE activates the TCI-state for the CORESET corresponding to the bit. Optionally, the bits in the bitmap correspond to the corresponding CORESET IDs according to their positions.

For each CORESET, taking CORESET ID1 as an example, the active TCI-states of CORESET ID1 are TCI-state $ID_{1,1}$ and TCI-state $ID_{1,2}$. Each active TCI-state ID of CORESETID1 is, for example, 7 bits.

In FIG. 11, both R1 and R represent reserved bits, R1 is for example 3 bits, and one R is 1 bit. R1 and/or R in FIG. 11 may also be used for other purposes (reserved bits in other embodiments may also be used for other purposes, which will not be described one by one). $C_1$-$C_z$ indicate whether the second active TCI-state for each CORESET in CORESET ID 1-CORESET ID Z exists. Taking CORESET ID 2 as an example, if $C_2$ is 1, it means that there is a second active TCI-state for CORESET ID 2. If $C_2$ is 0, it means that there is no second active TCI-state for CORESET ID 2. By adopting this solution, bits can be saved, and signaling overhead of the first MAC CE can be reduced.

In addition, if $C_2$ is 0, it can also indicate that the bit corresponding to TCI-state $ID_{1,2}$ is not applicable, so as to avoid the existence or non-existence of some fields that cause the size of the first MAC CE signaling to change, reducing the product implementation complexity.

Optionally, after the foregoing step 701, the first device further receives fourth configuration information from the second device.

Optionally, two active TCI-states are configured with the same QCL type. For example, the two active TCI-states are both configured with QCL-TypeA, or are both configured with QCL-TypeA and QCL-TypeD, or are both configured There is QCL-TypeD.

Optionally, the above PDCCH corresponds to a UE-specific search space.

Optionally, the second device sends a PDCCH to the first device on the same time domain resource and frequency domain resource from two TRPs. The above two active TCI-states correspond to transmissions on the two TRPs, respectively.

Optionally, the above RRC parameter coresetPoolIndex corresponding to the first CORESET is not configured.

Optionally, the number of bits in the tci indication field in the above PDCCH is greater than 0, for example, 3 bits.

Optionally, the RRC parameter tci-PresentInDCI corresponding to the first CORESET is configured as enabled.

Optionally, the RRC parameter tci-PresentInDCI-1-2 corresponding to the first CORESET is configured as enabled.

Figure 12:
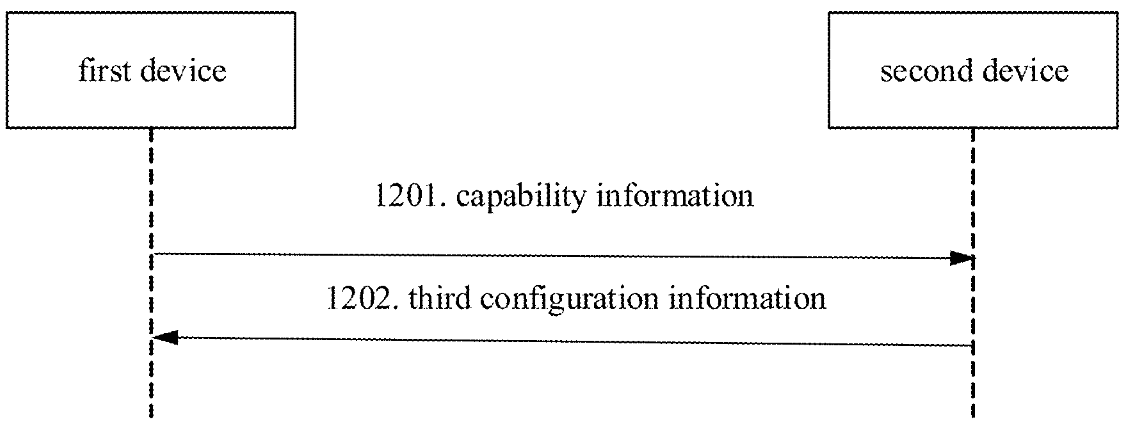
FIG. 12 is another flow chart of transmitting a physical downlink control channel provided by an embodiment of the present disclosure.

FIG. 12 is another flow chart of transmitting a physical downlink control channel provided by an embodiment of the present disclosure. In this embodiment, the second device configures K TCI-state groups for the first CORESET through the third configuration information, where K≥1 and K is an integer. This example includes:

In 1201, the first device sends capability information to the second device.

For details, reference may be made to the description of step 1001 in FIG. 10 above, which will not be repeated here.

In 1202, the first device receives third configuration information from the second device.

The third configuration information indicates N TCI-state lists, and the TCI-states at corresponding positions in the N TCI-state lists form the TCI-state group.

After receiving the third configuration information, the first device determines a TCI-state group. This TCI-state group corresponds to two active TCI-states.

For example, the third configuration information indicates two TCI-state lists, and the two TCI-state lists indicate X1 TCI-states and X2 TCI-states, respectively, and X2<X1. The first X2 TCI-states in the first TCI-state list are in one-to-one correspondence with the first X2 TCI-states in the second TCI-state list to form a group. An example of the third configuration information is as follows: taking the existing RRC parameter(s) as a starting point, corresponding modifications are made, and a new field such as tci-StatesPDCCH-ToAddlList2 is added. The name of the newly added field may be another name, which is not limited in the embodiments of the present disclosure.

For another example, the first device further receives second MAC CE signaling from the second device, where the second MAC CE signaling is used to indicate a first TCI-state group in the K TCI-state groups. The first TCI-state group corresponds to the N active TCI-states. That is to say, the second device indicates one TCI-state group (that is, the first TCI-state group) corresponding to the first CORESET through the second MAC CE signaling. The TCI-state group corresponds to the above N active TCI-states. Optionally, the second MAC CE signaling may further indicate one active TCI-state corresponding to the first CORESET. After receiving the second MAC CE signaling, the first device determines the position of the one active TCI-state in the first TCI-state list, and according to the position, the first device determines the second active TCI-state list from the second TCI-state list.

Optionally, in the above embodiments, when the first device receives the PDCCH from the second device on the first CORESET, the first device receives the PDCCH according to the QCL assumption corresponding to the two active TCI-states indicated by the first MAC CE signaling.

Optionally, two active TCI-states are configured with the same QCL type. For example, the two active TCI-states are both configured with QCL-TypeA, or are both configured with QCL-TypeA and QCL-TypeD, or are both configured There is QCL-TypeD.

Optionally, the above PDCCH corresponds to a UE-specific search space.

Optionally, the second device sends a PDCCH to the first device on the same time domain resource and frequency domain resource from two TRPs. The above two active TCI-states correspond to transmissions on the two TRPs, respectively.

Optionally, the above RRC parameter coresetPoolIndex corresponding to the first CORESET is not configured.

Optionally, the number of bits in the tci indication field in the above PDCCH is greater than 0, for example, 3 bits.

Optionally, the RRC parameter tci-PresentInDCI corresponding to the first CORESET is configured as enabled.

Optionally, the RRC parameter tci-PresentInDCI-1-2 corresponding to the first CORESET is configured as enabled.

Figure 13:
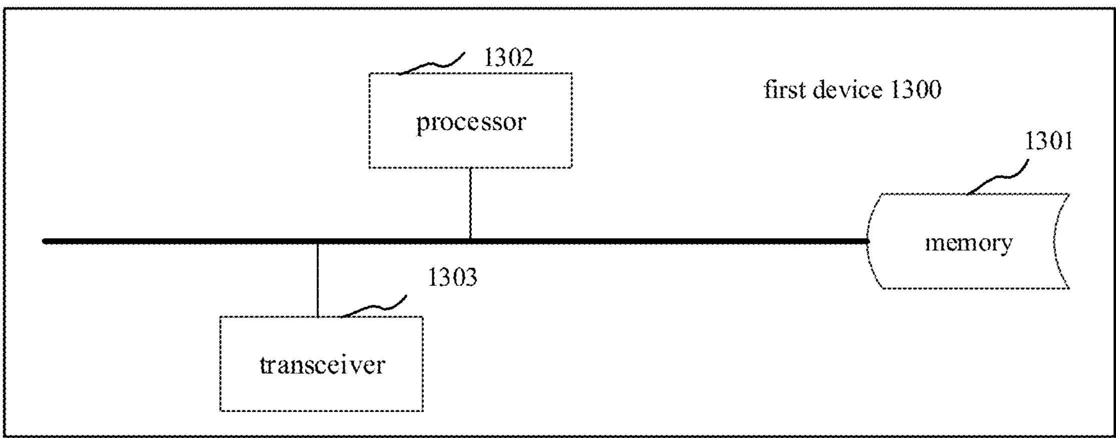
FIG. 13 is a schematic structural diagram of a first device provided by an embodiment of the present disclosure.

FIG. 13 is a schematic structural diagram of a first device provided by an embodiment of the present disclosure. Referring to FIG. 13, the first device 1300 provided by the embodiment of the present disclosure includes:

a memory 1301 storing an executable program code; and a processor 1302 and a transceiver 1303 coupled to the memory.

The transceiver is configured to receive Physical Downlink Control Channel (PDCCH) on a first Control Resource Set (CORESET), wherein a Demodulation Reference Signal (DMRS) for the PDCCH corresponds to N active Transmission Configuration Indicator-States (TCI-states), where N≥2 and N is an integer.

Optionally, the PDCCH corresponds to a first search space, and the first search space is a specific search space (USS) of the first device.

Optionally, each of the TCI-states includes the following information:

a state identity (ID) of the TCI-state used to identify a state of the TCI-state; and first Quasi-co-location (QCL) information.

Optionally, each of the TCI-states further includes: second QCL information.

Optionally, the PDCCH is transmitted from different beams among multiple beams, and different beams among the multiple beams correspond to different TCI-states among the N active TCI-states;

or, the PDCCH is transmitted from different transmission and reception points among multiple transmission and reception points, and different transmission and reception points among the multiple transmission and reception points correspond to different TCI-states among the N TCI-states.

Optionally, the N active TCI-states include a first TCI-state and a second TCI-state, and QCL types in the first TCI-state and the second TCI-state are the same.

Optionally, the first CORESET includes multiple physical resource blocks in a frequency domain and one to three Orthogonal Frequency Division Multiplexing (OFDM) symbols in a time domain, and the first CORESET is associated with at least one search space.

Optionally, a control resource set pool index coresetPoolIndex corresponding to the first CORESET is not configured.

Optionally, an indication field of a Transmission Configuration Indicator (TCI) in Downlink Control Information (DCI) corresponding to the first CORESET is at least one bit.

Optionally, transmission configuration indication information tci-PresentInDCI corresponding to the first CORESET is in an enable state.

Optionally, transmission configuration indication information tci-PresentInDCI-1-2 corresponding to the first CORESET is in an enable state.

Optionally, a Bandwidth Part (BWP) of the first device is configured with P CORESETs, where 1≤P≤5 and P is an integer, and the P CORESETs include the first CORESET.

Optionally, the P is at most 5; or the P is at most 3.

Optionally, the transceiver 1303 is further configured to, before receiving the PDCCH on the first CORESET, receive first configuration information from the second device; and the processor 1302 is further configured to configure the N active TCI-states for the first CORESET according to the first configuration information.

Optionally, the transceiver 1303 is further configured to, before receiving the PDCCH on the first CORESET, receive second configuration information from the second device; and the processor 1302 is further configured to configure M TCI-states for the first CORESET according to the second configuration information, where M≥N and M is an integer.

Optionally, the transceiver 1303 is further configured to, after receiving the second configuration information from the second device, receive first Medium Access Control Control Element (MAC CE) signaling from the second device, wherein the first MAC CE signaling is used to indicate the N active TCI-states among the M TCI-states.

Optionally, the first MAC CE signaling includes one or more of the following information:

serving cell indication information used to indicate a serving cell corresponding to the first MAC CE signaling;

CORESET indication information used to indicate a CORESET corresponding to the first MAC CE signaling;

first indication information used to indicate an active TCI-state among the N active TCI-states; and second indication information used to indicate another active TCI-state among the N active TCI-states.

Optionally, the first indication information is further used to indicate whether the first MAC CE signaling includes the second indication information.

Optionally, the first MAC CE signaling includes one or more of the following information:

serving cell indication information used to indicate a serving cell corresponding to the first MAC CE signaling;

CORESET indication information used to indicate a CORESET corresponding to the first MAC CE signaling;

first indication information used to indicate an active TCI-state among the N active TCI-states;

second indication information used to indicate another active TCI-state among the N active TCI-states; and a flag used to indicate whether the first MAC CE signaling includes the second indication information.

Optionally, the first MAC CE signaling is further used to indicate an active TCI-state for at least one second CORESET, and the first MAC CE signaling further includes one or more of the following information:

CORESET number used to indicate the number of the at least one second CORESET and the first CORESET;

CORESET indication information used to indicate at least one second CORESET;

third indication information and fourth indication information for each second CORESET, which are used to indicate two different active TCI-states for the second CORESET, respectively; and fifth indication information used to indicate whether the fourth indication information exists in the first MAC CE.

Optionally, the CORESET indication information includes an identity of each CORESET in one or more second CORESETs.

Optionally, the CORESET indication information is represented by a bitmap.

Optionally, the bitmap is 16 bits.

Optionally, when the number of CORESETs configured in the serving cell is less than or equal to 8, the bitmap is 8 bits, and when the number of CORESETs configured in the serving cell is greater than 8, the bitmap is 16 bits.

Optionally, the transceiver 1303 is further configured to, before receiving the PDCCH on the first CORESET, receive third configuration information from the second device; and the processor 1302 is further configured to configure K TCI-state groups for the first CORESET according to the third configuration information, wherein each TCI-state group in one or more TCI-state groups among the K TCI-state groups corresponds to the N active TCI-states, K≥1 and K is an integer.

Optionally, the third configuration information indicates N TCI-state lists, and TCI-states at corresponding positions of the N TCI-state lists form a TCI-state group.

Optionally, the transceiver 1303 is further configured to:

receive second MAC CE signaling from the second device, wherein the second MAC CE signaling is used to indicate a first TCI-state group in the K TCI-state groups, and the first TCI-state group corresponds to the N active TCI-states.

Optionally, when the PDCCH schedules a PDSCH, if a scheduling offset is greater than a first threshold and the PDSCH does not carry TCI indication information, the first device receives the PDSCH according to the N active TCI-states.

Optionally, when the PDCCH is used to schedule a PDSCH, if the scheduling offset is greater than a first threshold and the PDSCH does not carry TCI indication information, the first device receives the PDSCH according to a first TCI-state among the N active TCI-states.

Optionally, the processor 1302 is further configured to:

determine the first TCI-state according to identities or position of respective TCI-states in the N active TCI-states, wherein the positions are positions of the N active TCI-states in the first MAC CE signaling, or the positions are positions of the N active TCI-states in first configuration information.

Optionally, when the PDCCH schedules a PDSCH, a scheduling offset is greater than a first threshold, or the scheduling offset is greater than or equal to the first threshold.

Optionally, when the PDCCH is used to schedule a PDSCH, if a scheduling offset is smaller than a first threshold and the first device needs to determine a QCL assumption related to PDSCH reception according to the first CORESET, the first device receives the PDSCH according to the N active TCI-states.

Optionally, when the PDCCH schedules a PDSCH, if a scheduling offset is smaller than a first threshold and the first device needs to determine a QCL assumption related to PDSCH reception according to the first CORESET, the first device schedules the PDSCH according to the first TCI-state in the N active TC-states.

Optionally, the processor 1302 is further configured to:

determine the first TCI-state according to identities or positions of respective TCI-states in the N active TCI-states, wherein the positions are positions of the N active TCI-states in the first MAC CE signaling, or the positions are positions of the N active TCI-states in first configuration information.

Optionally, the transceiver 1303 is further configured to:

receive fourth configuration information from the second device, wherein the fourth configuration information is used to indicate that a DMRS for at least part of at least one PDCCH received by the first device corresponds to the N active TCI-states.

Optionally, the fourth configuration information and the first configuration information are carried in same signaling, or the fourth configuration information and the first configuration information are same signaling.

Optionally, the fourth configuration information and the second configuration information are carried in same signaling, or the fourth configuration information and the second configuration information are same signaling.

Optionally, the fourth configuration information and the third configuration information are carried in same signaling, or the fourth configuration information and the third configuration information are same signaling.

Optionally, the transceiver 1303 is further configured to:

send capability information to the second device, wherein the capability information is used to indicate that the first device supports receiving a PDCCH corresponding to the N active TCI-states.

Optionally, the capability information is carried in capability signaling of the first device.

Optionally, the capability information is carried in Radio Resource Control (RRC) signaling or Medium Access Control Control Element (MAC CE) signaling.

Optionally, the transceiver 1303 is configured to: send capability information to the second device per frequency band.

Optionally, the transceiver 1303 is configured to: send the capability information to the second device per frequency band combination.

Optionally, the transceiver 1303 is configured to: send the capability information to the second device per frequency band per frequency band combination.

Figure 14:
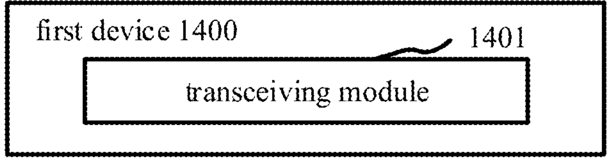
FIG. 14 is a schematic structural diagram of another first device provided by an embodiment of the present disclosure.

FIG. 14 is a schematic structural diagram of another first device provided by an embodiment of the present disclosure. Referring to FIG. 14, the first device 1400 provided by the embodiment of the present disclosure includes a transceiving module 1401.

The transceiving module 1401 is configured to receive Physical Downlink Control Channel (PDCCH) on a first Control Resource Set (CORESET), wherein a Demodulation Reference Signal (DMRS) for the PDCCH corresponds to N active Transmission Configuration Indicator-States (TCI-states), where N≥2 and N is an integer.

Regarding the working principles of the first device 1400, reference may be made to the descriptions of embodiments of the methods performed by the first device, and repeated descriptions are omitted here.

Figure 15:
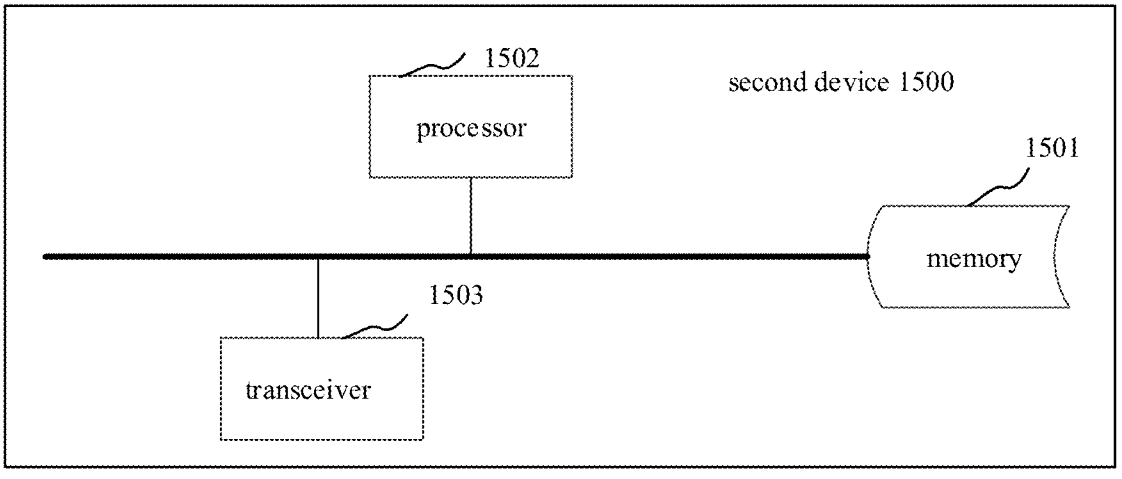
FIG. 15 is a schematic structural diagram of a second device provided by an embodiment of the present disclosure.

FIG. 15 is a schematic structural diagram of a second device provided by an embodiment of the present disclosure. Referring to FIG. 15, the second device 1500 provided by the embodiment of the present disclosure includes:

a memory 1501 storing an executable program code; and a processor 1502 and a transceiver 1503 coupled to the memory 1501.

The transceiver 1503 is configured to send Physical Downlink Control Channel (PDCCH) to a second device on a first Control Resource Set (CORESET), wherein a Demodulation Reference Signal (DMRS) for the PDCCH corresponds to N active Transmission Configuration Indicator-States (TCI-states), where N≥2 and N is an integer.

Optionally, the PDCCH corresponds to a first search space, and the first search space is a specific search space (USS) of the first device.

Optionally, each of the TCI-states includes the following information:

a state identity (ID) of the TCI-state used to identify a state of the TCI-state; and first Quasi-co-location (QCL) information.

Optionally, each of the TCI-states further includes: second QCL information.

Optionally, the PDCCH is transmitted from different beams among multiple beams, and different beams among the multiple beams correspond to different TCI-states among the N active TCI-states; or, the PDCCH is transmitted from different transmission and reception points among multiple transmission and reception points, and different transmission and reception points among the multiple transmission and reception points correspond to different TCI-states among the N TCI-states.

Optionally, the N active TCI-states include a first TCI-state and a second TCI-state, and QCL types in the first TCI-state and the second TCI-state are the same.

Optionally, the first CORESET includes multiple physical resource blocks in a frequency domain and one to three Orthogonal Frequency Division Multiplexing (OFDM) symbols in a time domain, and the first CORESET is associated with at least one search space.

Optionally, a control resource set pool index coresetPoolIndex corresponding to the first CORESET is not configured.

Optionally, an indication field of a Transmission Configuration Indicator (TCI) in Downlink Control Information (DCI) corresponding to the first CORESET is at least one bit.

Optionally, transmission configuration indication information tci-PresentInDCI corresponding to the first CORESET is in an enable state.

Optionally, transmission configuration indication information tci-PresentInDCI-1-2 corresponding to the first CORESET is in an enable state.

Optionally, a Bandwidth Part (BWP) of the first device is configured with P CORESETs, where $1 \leq P \leq 5$ and P is an integer, and the P CORESETs include the first CORESET.

Optionally, the P is at most 5; or the P is at most 3.

Optionally, the transceiver 1503 is further configured to, before sending the PDCCH on the first CORESET, send first configuration information to the first device; and wherein the first configuration information is used for configuring the N active TCI-states for the first CORESET.

Optionally, the transceiver 1503 is configured to, before sending the PDCCH on the first CORESET, send second configuration information to the first device; and wherein the second configuration information is used for configuring M TCI-states for the first CORESET, where $M \geq N$ and M is an integer.

Optionally, the transceiver 1503 is further configured to, after sending the second configuration information to the first device, send first Medium Access Control Control Element (MAC CE) signaling to the first device, wherein the first MAC CE signaling is used to indicate the N active TCI-states among the M TCI-states.

Optionally, the first MAC CE signaling includes one or more of the following pieces of information:

- serving cell indication information used to indicate a serving cell corresponding to the first MAC CE signaling;
- CORESET indication information used to indicate a CORESET corresponding to the first MAC CE signaling;
- first indication information used to indicate an active TCI-state among the N active TCI-states; and
- second indication information used to indicate another active TCI-state among the N active TCI-states.

Optionally, the first indication information is further used to indicate whether the first MAC CE signaling includes the second indication information.

Optionally, the first MAC CE signaling includes one or more of the following information:

- serving cell indication information used to indicate a serving cell corresponding to the first MAC CE signaling;
- CORESET indication information used to indicate a CORESET corresponding to the first MAC CE signaling;
- first indication information used to indicate an active TCI-state among the N active TCI-states;
- second indication information used to indicate another active TCI-state among the N active TCI-states; and
- a flag used to indicate whether the first MAC CE signaling includes the second indication information.

Optionally, the first MAC CE signaling is further used to indicate an active TCI-state for at least one second CORESET, and the first MAC CE signaling further includes one or more of the following pieces of information:

- CORESET number used to indicate the number of the at least one second CORESET and the first CORESET;
- CORESET indication information used to indicate at least one second CORESET;
- third indication information and fourth indication information for each second CORESET, which are used to indicate two different active TCI-states for the second CORESET, respectively; and
- fifth indication information used to indicate whether the fourth indication information exists in the first MAC CE.

Optionally, the CORESET indication information includes an identity of each CORESET in one or more second CORESETs.

Optionally, the CORESET indication information is represented by a bitmap.

Optionally, the bitmap is 16 bits.

Optionally, when the number of CORESETs configured in the serving cell is less than or equal to 8, the bitmap is 8 bits, and when the number of CORESETs configured in the serving cell is greater than 8, the bitmap is 16 bits.

Optionally, the transceiver 1503 is configured to, before sending the PDCCH on the first CORESET, send third configuration information to the first device; and the third configuration information is used for configuring K TCI-state groups for the first CORESET, wherein each TCI-state group in one or more TCI-state groups among the K TCI-state groups corresponds to the N active TCI-states, $K \geq 1$ and K is an integer.

Optionally, the third configuration information indicates N TCI-state lists, and TCI-states at corresponding positions of the N TCI-state lists form a TCI-state group.

Optionally, the transceiver 1503 is further configured to:

send second MAC CE signaling to the first device, wherein the second MAC CE signaling is used to indicate a first TCI-state group in the K TCI-state groups, and the first TCI-state group corresponds to the N active TCI-states.

Optionally, the transceiver 1503 is further configured to:

send fourth configuration information to the second device, wherein the fourth configuration information is used to indicate that a DMRS for at least part of at least one PDCCH received by the first device corresponds to the N active TCI-states.

Optionally, the fourth configuration information and the first configuration information are carried in same signaling, or the fourth configuration information and the first configuration information are same signaling.

Optionally, the fourth configuration information and the second configuration information are carried in same signaling, or the fourth configuration information and the second configuration information are same signaling.

Optionally, the fourth configuration information and the third configuration information are carried in same signaling, or the fourth configuration information and the third configuration information are same signaling.

Optionally, the transceiver 1503 is further configured to:

receive capability information from the first device, wherein the capability information is used to indicate that the first device supports receiving a PDCCH corresponding to the N active TCI-states.

Optionally, the capability information is carried in capability signaling of the first device.

Optionally, the capability information is carried in Radio Resource Control (RRC) signaling or Medium Access Control Control Element (MAC CE) signaling.

Optionally, the transceiver 1503 is configured to: receive the capability information which is sent from the first device per frequency band.

Optionally, the transceiver 1503 is configured to: receive the capability information which is sent from the first device per frequency band combination.

Optionally, the transceiver 1503 is configured to: receive the capability information which is sent from the first device per frequency band per frequency band combination.

Figure 16:
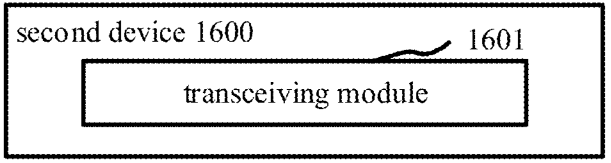
FIG. 16 is a schematic structural diagram of another second device provided by an embodiment of the present disclosure.

FIG. 16 is a schematic structural diagram of another second device provided by an embodiment of the present disclosure. Referring to FIG. 16, the second device 1600 provided by the embodiment of the present disclosure includes a transceiving module 1601.

The transceiving module 1601 is configured to send Physical Downlink Control Channel (PDCCH) to a second device on a first Control Resource Set (CORESET), wherein a Demodulation Reference Signal (DMRS) for the PDCCH corresponds to N active Transmission Configuration Indicator-States (TCI-states), where N≥2 and N is an integer.

Regarding the working principles of the second device 1600, reference may be made to the descriptions of embodiments of the methods performed by the first device, and repeated descriptions are omitted here.

An embodiment of the present disclosure further provides a computer-readable storage medium, including computer instructions which, when run on a first device, cause the first device to perform the above methods applied to the first device.

An embodiment of the present disclosure also provides a computer-readable storage medium, including computer instructions which, when run on a second device, cause the second device to perform the above methods applied to the second device.

An embodiment of the present disclosure further provides a computer program product, including computer instructions. When the computer program product runs on the first device, the first device is caused to perform the above methods applied to the first device.

An embodiment of the present disclosure further provides a computer program product, including computer instructions. When the computer program product runs on the second device, the second device is caused to perform the above methods applied to the second device.

An embodiment of the present disclosure also provides a chip. The chip is coupled with the memory in the first device, so that the chip calls the program instructions stored in the memory during operation, to cause the first device to perform the above methods applied to the first device.

An embodiment of the present disclosure also provides a chip. The chip is coupled with the memory in the second device, so that the chip calls the program instructions stored in the memory during operation, to cause the second device to perform the above processes applied to the second device.

The above embodiments may be implemented in whole or in part by software, hardware, firmware or any combination thereof. When implemented using software, the embodiments may be implemented in whole or in part in the form of a computer program product. A computer program product includes one or more computer instructions. When the computer program instructions are loaded and executed on a computer, the processes or functions according to the embodiments of the present disclosure will be generated in whole or in part. A computer can be a general purpose computer, special purpose computer, computer network, or other programmable device. Computer instructions may be stored in a computer-readable storage medium, or transmitted from one computer-readable storage medium to another computer-readable storage medium. For example, computer instructions may be transmitted from a website site, computer, server or data center in a wired manner (e.g., coaxial cable, optical fiber, digital subscriber line (DSL)) or in a wireless manner (e.g., infrared, wireless, microwave, etc.) to another website site, computer, server, or data center. The computer-readable storage medium may be any available medium that can be accessed by a computer, or a data storage device such as a server, or a data center, and so on, that is integrated with one or more available mediums. The available medium may be magnetic medium (e.g., floppy disk, hard disk, magnetic tape), optical medium (e.g., DVD), or semiconductor medium (e.g., Solid State Disk (SSD)).

The terms "first", "second", "third", "fourth", etc. (if any) in the description and claims of the present disclosure and the above drawings are used to distinguish similar objects, and not necessarily used to describe a specific sequence or order. It is to be understood that the terms so used are interchangeable under appropriate circumstances such that the embodiments described herein can be implemented in sequences other than those illustrated or described herein. Furthermore, the terms "comprising" and "having", as well as any variations thereof, are intended to cover a non-exclusive inclusion. For example, a process, method, system, product or device comprising a sequence of steps or units is not necessarily limited to the expressly listed steps or units, but may include other steps or units not explicitly listed or other steps or units inherent to the process, method, product or device.

What is claimed is:

1. A method for transmitting a physical downlink control channel, comprising:

receiving, by a terminal device, a Physical Downlink Control Channel (PDCCH) from a network device on a first Control Resource Set (CORESET), wherein a Demodulation Reference Signal (DMRS) for the PDCCH corresponds to N active Transmission Configuration Indicator-States (TCI-states), where N=2;

wherein before the terminal device receives the PDCCH from the network device on the first CORESET, the method further comprises:

receiving, by the terminal device, second configuration information from the network device; and configuring, by the terminal device, M TCI-states for the first CORESET according to the second configuration information, where M≥N and M is an integer;

wherein after the terminal device receives the second configuration information from the network device, the method further comprises:

receiving, by the terminal device, first Medium Access Control Control Element (MAC CE) signaling from the network device, wherein the first MAC CE signaling is used to indicate the N active TCI-states among the M TCI-states;

wherein the first MAC CE signaling comprises:

serving cell indication information used to indicate a serving cell corresponding to the first MAC CE signaling;

CORESET indication information used to indicate a CORESET corresponding to the first MAC CE signaling;

first indication information used to indicate an active TCI-state among the N active TCI-states; and second indication information used to indicate another active TCI-state among the N active TCI-states;

wherein when the PDCCH schedules a PDSCH, if a scheduling offset is smaller than a first threshold and the terminal device needs to determine a Quasi-co-location (QCL) assumption related to PDSCH reception according to the first CORESET, the terminal device schedules the PDSCH according to a first TCI-state in the N active TCI-states;

wherein the method further comprises:

determining, by the terminal device, the first TCI-state according to positions of respective TCI-states in the N active TCI-states;

wherein the first TCI-state is a TCI-state which has a forward position among the N active TCI-states in the first MAC CE signaling;

wherein the method further comprises:

receiving, by the terminal device, fourth configuration information from the network device, wherein the fourth configuration information is used to indicate that a DMRS for at least part of at least one PDCCH received by the terminal device corresponds to the N active TCI-states.

2. The method according to claim 1, wherein the PDCCH corresponds to a first search space, and the first search space is a specific search space (USS) of the terminal device.

3. The method according to claim 1, wherein each of the TCI-states comprises the following information:

a state identity (ID) of the TCI-state used to identify a state of the TCI-state; and first Quasi-co-location (QCL) information;

wherein each of the TCI-states further comprises: second QCL information.

4. The method according to claim 1, wherein the first CORESET comprises multiple physical resource blocks in a frequency domain and one to three Orthogonal Frequency Division Multiplexing (OFDM) symbols in a time domain, and the first CORESET is associated with at least one search space.

5. The method according to claim 1, wherein an indication field of a Transmission Configuration Indicator (TCI) in Downlink Control Information (DCI) corresponding to the first CORESET is at least one bit; and/or wherein transmission configuration indication information tci-PresentInDCI corresponding to the first CORESET is in an enable state; and/or wherein transmission configuration indication information tci-PresentInDCI-1-2 corresponding to the first CORESET is in an enable state.

6. The method according to claim 1, wherein a Bandwidth Part (BWP) of the terminal device is configured with P CORESETs, where $1 \le P \le 5$ and P is an integer, and the P CORESETs comprise the first CORESET;

wherein the P is at most 5; or the P is at most 3.

7. The method according to claim 1, further comprising:

sending, by the terminal device, capability information to the network device, wherein the capability information is used to indicate that the terminal device supports receiving a PDCCH corresponding to the N active TCI-states;

wherein the capability information is carried in capability signaling of the terminal device;

or, wherein the capability information is carried in Radio Resource Control (RRC) signaling.

8. A terminal device, comprising:

a memory storing an executable program code; and a processor and a transceiver coupled to the memory;

wherein the transceiver is configured to receive Physical Downlink Control Channel (PDCCH) on a first Control Resource Set (CORESET), wherein a Demodulation Reference Signal (DMRS) for the PDCCH corresponds to N active Transmission Configuration Indicator-States (TCI-states), where N=2;

wherein the transceiver is further configured to, before receiving the PDCCH on the first CORESET, receive second configuration information from a network device; and wherein the processor is further configured to configure M TCI-states for the first CORESET according to the second configuration information, where $M \ge N$ and M is an integer;

wherein the transceiver is further configured to, after receiving the second configuration information from the network device, receive first Medium Access Control Control Element (MAC CE) signaling from the network device, wherein the first MAC CE signaling is used to indicate the N active TCI-states among the M TCI-states;

wherein the first MAC CE signaling comprises:

serving cell indication information used to indicate a serving cell corresponding to the first MAC CE signaling;

CORESET indication information used to indicate a CORESET corresponding to the first MAC CE signaling;

first indication information used to indicate an active TCI-state among the N active TCI-states; and second indication information used to indicate another active TCI-state among the N active TCI-states;

wherein when the PDCCH schedules a PDSCH, if a scheduling offset is smaller than a first threshold and the terminal device needs to determine a Quasi-co-location (QCL) assumption related to PDSCH reception according to the first CORESET, the terminal device schedules the PDSCH according to a first TCI-state in the N active TCI-states;

wherein the processor is further configured to:

determine the first TCI-state according to positions of respective TCI-states in the N active TCI-states;

wherein the first TCI-state is a TCI-state which has a forward position among the N active TCI-states in the first MAC CE signaling;

wherein the transceiver is further configured to:

receive fourth configuration information from the network device, wherein the fourth configuration information is used to indicate that a DMRS for at least part of at least one PDCCH received by the terminal device corresponds to the N active TCI-states.

9. The device according to claim 8, wherein the PDCCH corresponds to a first search space, and the first search space is a specific search space (USS) of the terminal device.

10. The device according to claim 8, wherein each of the TCI-states comprises the following information:
a state identity (ID) of the TCI-state used to identify a state of the TCI-state; and
first Quasi-co-location (QCL) information;
wherein each of the TCI-states further comprises: second QCL information.

11. A network device, comprising:
a memory storing an executable program code; and
a transceiver coupled to the memory;
wherein the transceiver is configured to send Physical Downlink Control Channel (PDCCH) to a terminal device on a first Control Resource Set (CORESET), wherein a Demodulation Reference Signal (DMRS) for the PDCCH corresponds to N active Transmission Configuration Indicator-States (TCI-states), where N=2;
wherein the transceiver is configured to, before sending the PDCCH on the first CORESET, send second configuration information to the terminal device; and
wherein the second configuration information is used for configuring M TCI-states for the first CORESET, where M≥N and M is an integer;
wherein the transceiver is further configured to, after sending the second configuration information to the terminal device, send first Medium Access Control Control Element (MAC CE) signaling to the terminal device, wherein the first MAC CE signaling is used to indicate the N active TCI-states among the M TCI-states;
wherein the first MAC CE signaling comprises:
serving cell indication information used to indicate a serving cell corresponding to the first MAC CE signaling;
CORESET indication information used to indicate a CORESET corresponding to the first MAC CE signaling;
first indication information used to indicate an active TCI-state among the N active TCI-states; and
second indication information used to indicate another active TCI-state among the N active TCI-states;
wherein the first MAC CE signaling is used for the terminal device to schedule the PDSCH according to a first TCI-state in the N active TCI-states when the PDCCH schedules a PDSCH and if a scheduling offset is smaller than a first threshold and the terminal device needs to determine a Quasi-co-location (QCL) assumption related to PDSCH reception according to the first CORESET;
wherein the first TCI-state is determined according to positions of respective TCI-states in the N active TCI-states, and the first TCI-state a TCI-state which has a forward position among the N active TCI-states in the first MAC CE signaling;
wherein the transceiver is further configured to:
send fourth configuration information to the terminal device, wherein the fourth configuration information is used to indicate that a DMRS for at least part of at least one PDCCH received by the terminal device corresponds to the N active TCI-states.

12. The device according to claim 11, wherein the first CORESET comprises multiple physical resource blocks in a frequency domain and one to three Orthogonal Frequency Division Multiplexing (OFDM) symbols in a time domain, and the first CORESET is associated with at least one search space.

13. The device according to claim 11, wherein a control resource set pool index coresetPoolIndex corresponding to the first CORESET is not configured.

14. The device according to claim 11, wherein an indication field of a Transmission Configuration Indicator (TCI) in Downlink Control Information (DCI) corresponding to the first CORESET is at least one bit; and/or
wherein transmission configuration indication information tci-PresentInDCI corresponding to the first CORESET is in an enable state; and/or
wherein transmission configuration indication information tci-PresentInDCI-1-2 corresponding to the first CORESET is in an enable state.

15. The device according to claim 11, wherein a Bandwidth Part (BWP) of the terminal device is configured with P CORESETs, where 1≤P≤5 and P is an integer, and the P CORESETs comprise the first CORESET;
wherein the P is at most 5; or the P is at most 3.

* * * * *